United States Patent [19]
Ooba et al.

[11] Patent Number: 4,896,945
[45] Date of Patent: Jan. 30, 1990

[54] LIQUID CRYSTAL CELL ARRAY AND METHOD FOR DRIVING THE SAME

[75] Inventors: Yuji Ooba, Tokyo; Tadaaki Masumori, Kodaira; Shigeo Sugihara, Kunitachi, all of Japan

[73] Assignee: Nippon Telegraph and Telephone Corporation, Tokyo, Japan

[21] Appl. No.: 280,925

[22] Filed: Dec. 7, 1988

[30] Foreign Application Priority Data

Dec. 14, 1987 [JP] Japan .................................. 62-315709
Dec. 21, 1987 [JP] Japan .................................. 62-321401
Sep. 20, 1988 [JP] Japan .................................. 63-233578

[51] Int. Cl.$^4$ ................................................ G02F 1/13
[52] U.S. Cl. ...................................... 350/332; 350/336; 350/350 S; 350/346; 350/331 R
[58] Field of Search ................... 350/331 R, 346, 332, 350/333, 336, 350 S; 340/784

[56] References Cited

U.S. PATENT DOCUMENTS

| | | | |
|---|---|---|---|
| 4,082,430 | 4/1978 | Schulthess et al. | 350/333 |
| 4,673,256 | 6/1987 | Hehlen et al. | 350/333 X |
| 4,763,994 | 8/1988 | Kaneko et al. | 350/336 |
| 4,776,676 | 10/1988 | Inoue et al. | 350/333 X |
| 4,799,770 | 1/1989 | Kahn et al. | 350/331 R |

OTHER PUBLICATIONS

Bak et al., "Fast Decay in a Twisted Nematic Induced by Frequency Switching", Journal of Appl. Phys., vol. 46, No. 1, Jan. 1975, pp. 1–4.

Primary Examiner—Stanley D. Miller
Assistant Examiner—Huy K. Mai
Attorney, Agent, or Firm—Pollock, Vande Sande and Priddy

[57] ABSTRACT

A first transparent substrate has formed thereon a plurality of sequentially arranged first transparent electrodes and a plurality of individual cell drive lines each connected to one of them. A second transparent substrate has formed thereon at least one transparent electrode opposite the first transparent electrodes and first and second common drive lines each connected to one side of the second transparent electrode. The first and second transparent substrates are disposed opposite one another with a gap defined therebetween and the gap is filled with liquid crystal to form a liquid crystal cell array. Voltages of different magnitudes are applied to the first and second common drive lines to simultaneously form substantially the same voltage gradient in the second transparent electrode in all of cell windows, and at the same time, voltages corresponding to pixel signals are applied to the individual cell drive lines, respectively, thereby controlling the aperture ratios of all the cell windows. In driving a cell array using a two-frequency drive liquid crystal, in an operation mode for closing all the cell windows a low-frequency voltage is applied to the liquid crystal, and in an operation mode for diaphragming at least one of the cell windows, different high- or low-frequency voltages are applied to the first and second common drive lines, forming a high- or low-frequency voltage gradient in each cell window.

19 Claims, 16 Drawing Sheets

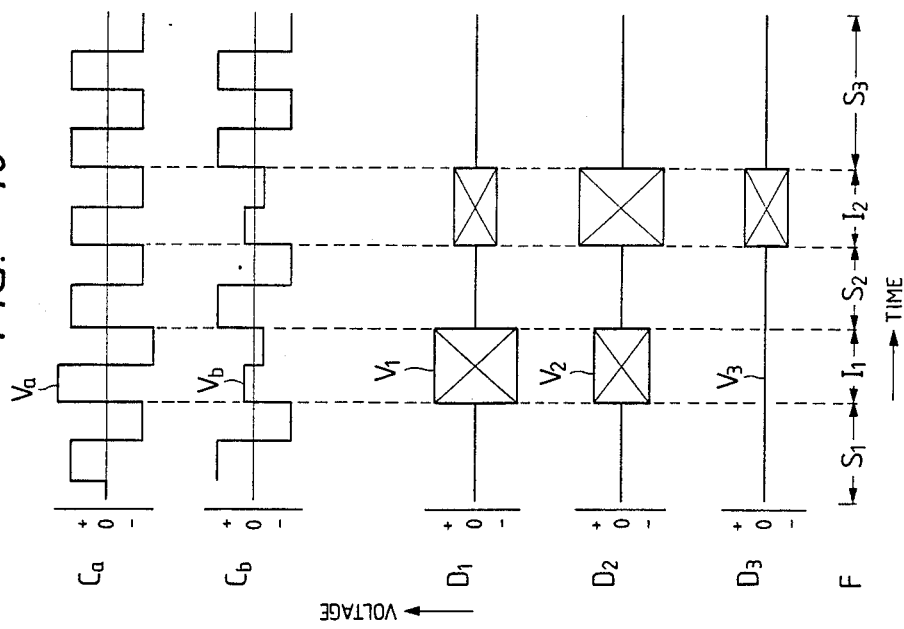
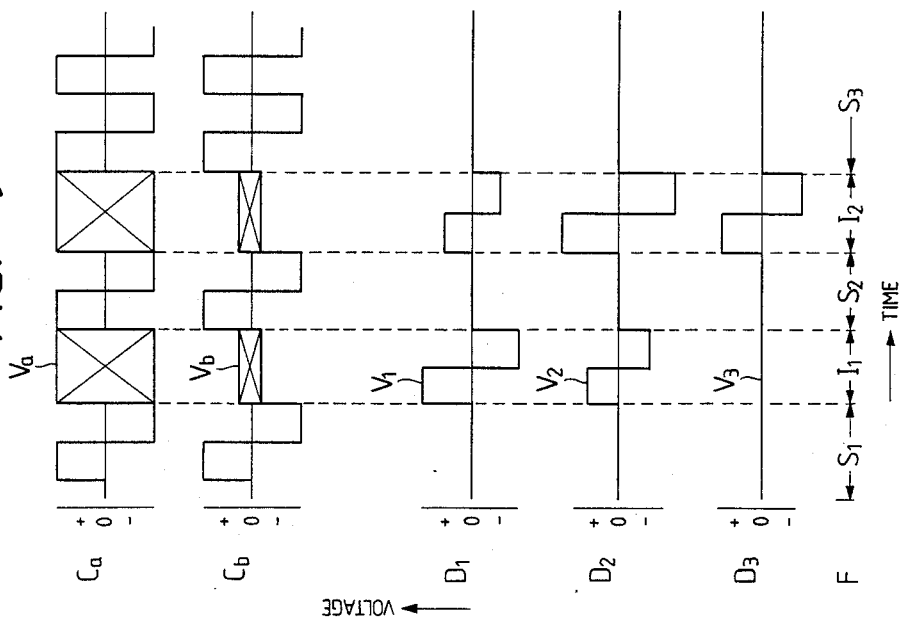

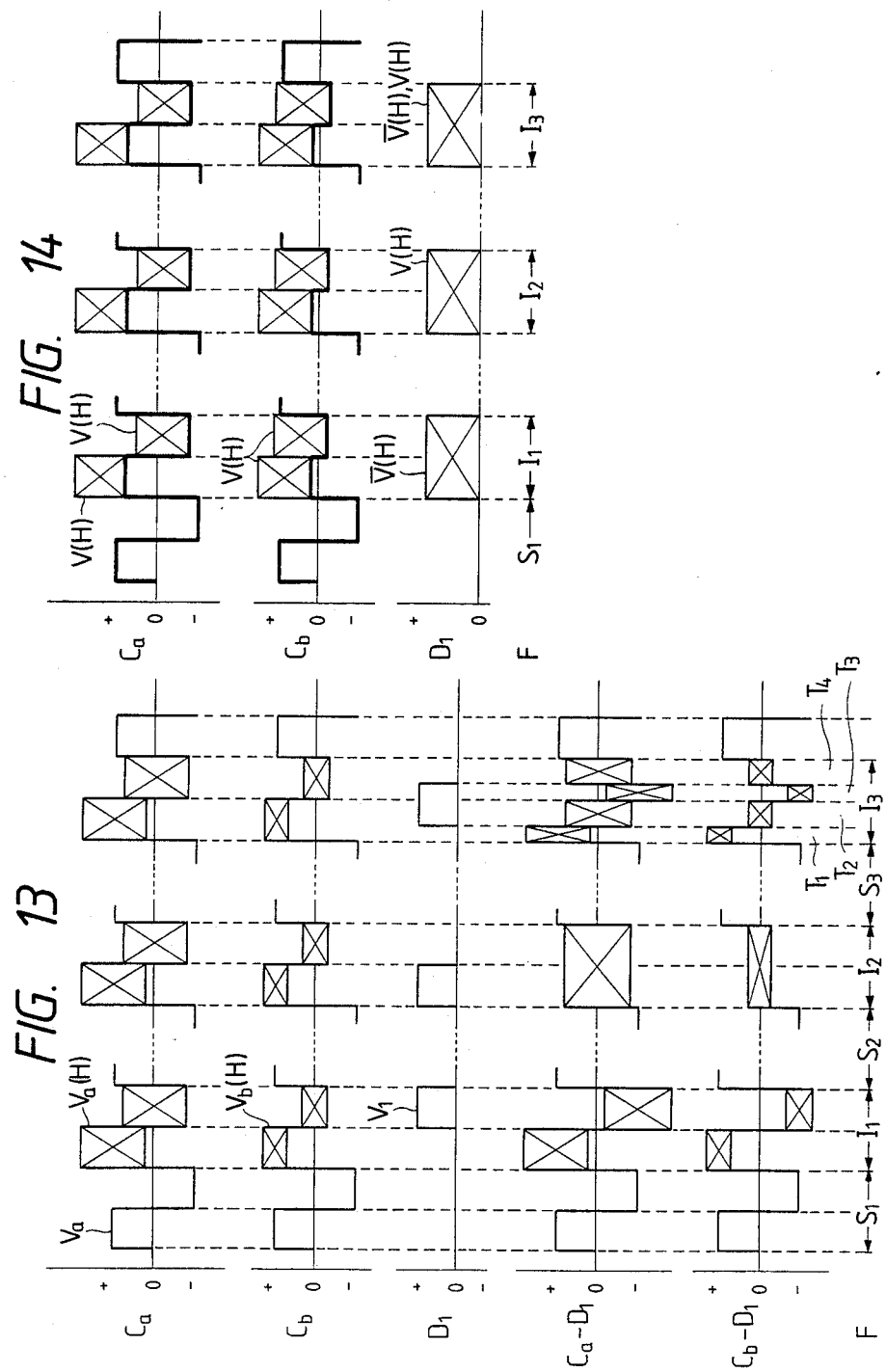

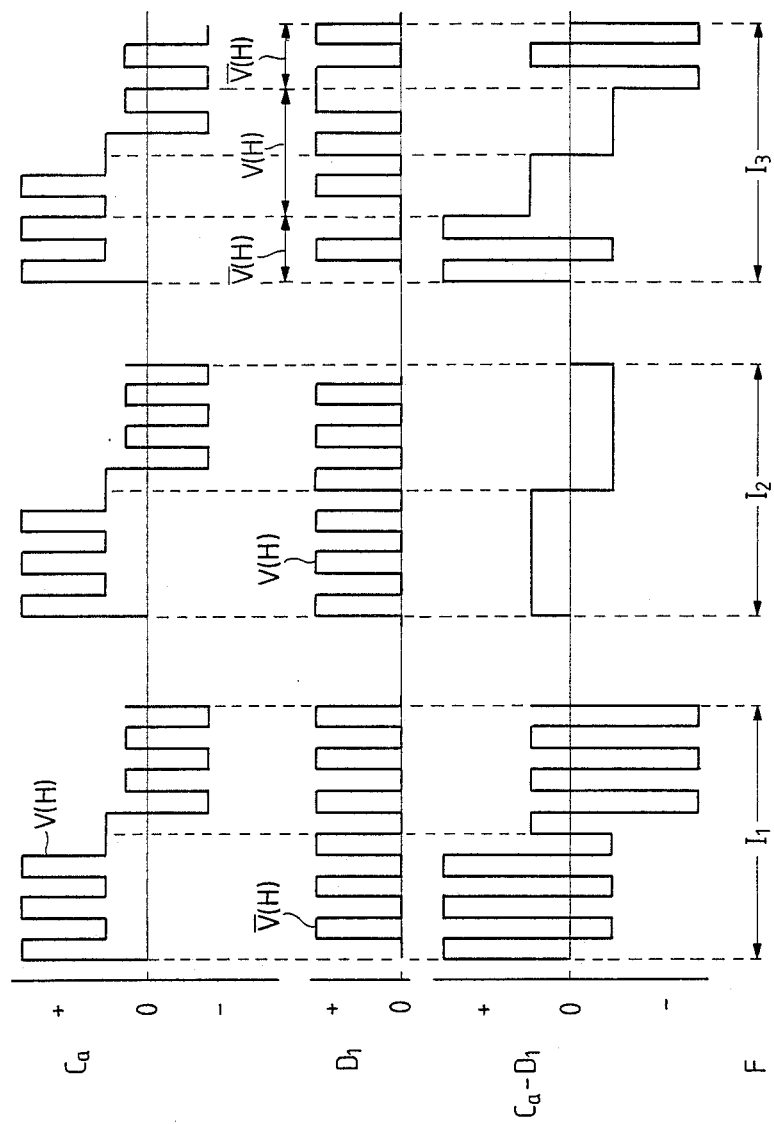

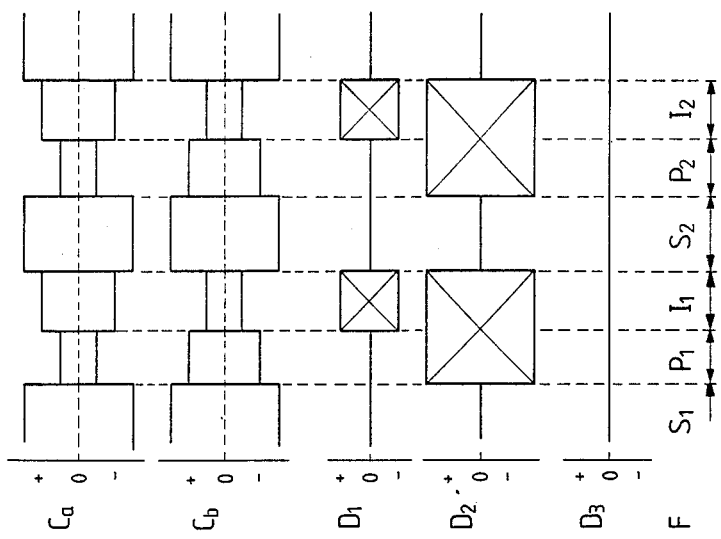
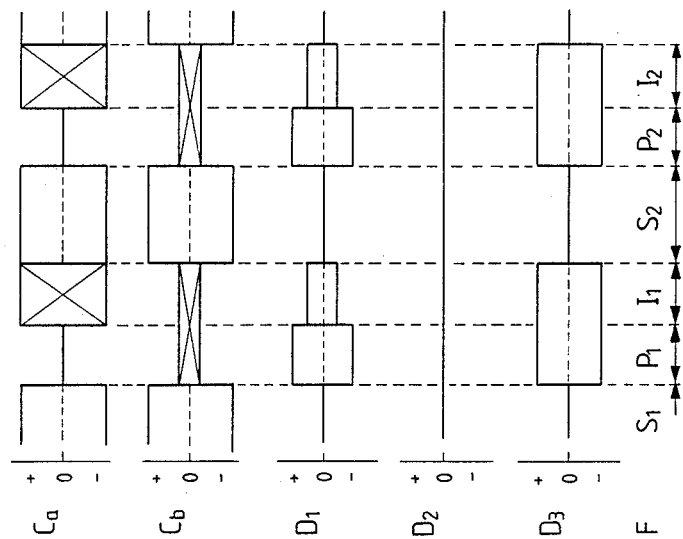

LIQUID CRYSTAL CELL ARRAY AND METHOD FOR DRIVING THE SAME

BACKGROUND OF THE INVENTION

The present invention relates to a liquid crystal cell array which can be applied to a liquid crystal light shutter capable of modulating the light-transmitting (or bright) area by the operation of individual liquid crystal cells. The invention also pertains to a method for driving such a liquid crystal cell array.

Heretofore, liquid crystal has been applied not only to character and image displays but also to a light shutter which controls the transmission therethrough of light. In the light shutter the transmission of light through the liquid crystal is usually subjected to ON-OFF control on a binary basis. The present inventors produced a nematic liquid crystal cell with a metal electrode deposited on either side of a transparent electrode, and proposed a driving method therefor according to which a potential gradient is produced in the transparent electrode by applying different voltages to the metal electrodes to form a light-transmitting and a light-intercepting areas (this operation will hereinafter be referred to as the diaphragming operation) and the ratio between these areas can freely be varied by controlling the potential gradient (Japanese Patent Application No. 181,912/86). The principle of the driving method will be described with reference to FIG. 1.

FIG. 1 is an exploded perspective view, partly cut away, of a liquid crystal cell 11 which is used for forming the above-mentioned liquid crystal light shutter. The liquid crystal cell 11 is made up of a spacer 4 and a pair of opposed transparent substrates 2 and 3 with the spacer 4 interposed therebetween and contains liquid crystal in the space defined by the two transparent substrates 2 and 3 and the spacer 4. The one transparent substrate 2 (hereinafter referred to also as the first substrate) has a transparent electrode 9 deposited on the inner surface thereof and a metal electrode 7 deposited on one marginal portion of the transparent electrode 9. The other transparent substrate 3 (hereinafter referred to also as the second substrate) also has a transparent electrode 8 deposited on the inner surface thereof and metal electrodes 5 and 6 deposited in parallel on both marginal portions of the transparent electrode 8. A pair of opposed polarizing plates (not shown) are disposed with such a liquid crystal cell sandwiched therebetween, forming a light shutter. The area over which light is transmitted through the transparent electrodes 2 and 3 of the liquid crystal cell 11 is called a cell window. In general, the transparent electrodes 8 and 9 are formed by transparent conductive films of the indium oxide or tin oxide series and the metal electrodes 5 to 7 are formed by vapor deposition of aluminum, nickel or chromium, but these electrodes are not limited specifically to them and may be formed of any materials so long as they are lower in resistance than the transparent electrodes 8 and 9 and capable of intercepting light. The following description of the prior art will be given of the case where the liquid crystal sealed in the cell 11 is ferroelectric liquid crystal. Since the ferroelectric liquid crystal changes its orientation from one to the other upon inversion of the polarity of the applied voltage, it is possible to determine the direction of polarization of the polarizing plates relative to the liquid crystal cell 11 so that it permits or inhibits the passage therethrough of light in response to a desired one of the polarities of the applied voltage.

Next, the basic operation of the liquid crystal cell 11 of the above arrangement will be described with regard to the drawings. The inner marginal edges (hereinafter referred to as electrode edges) of the metal electrodes 5 and 6 on the second substrate 3 in FIG. 1 are indicated by a and b, respectively. When voltages $V_1$ and $V_2$ are applied to the metal electrodes 5 and 6, respectively, if the voltages $V_1$ and $V_2$ are not equal, then current will flow through the transparent electrode 8 across the metal electrodes 5 and 6. At this time, the transparent electrode 8 serves as a resistor, and accordingly, a substantially linear potential gradient develops in the transparent electrode 8 between the electrode edges a and b. This is shown in FIG. 2A, in which the solid line (i) indicates the potential gradient developed between the electrode edges a and b. On the other hand, when a voltage $V_3$ is fed to the metal electrode 7 of the first substrate 2, the potential on the transparent electrode 9 will become constant over the area of its surface as indicated by the solid line (ii) in FIG. 2A. As a result of this, a voltage corresponding to the difference between the solid lines (i) and (ii), that is, a voltage corresponding to the potential difference is provided between the two transparent electrodes 8 and 9 and this voltage is applied to the liquid crystal sandwiched between them.

Now, the direction of the polarizing plates is predetermined so that light is intercepted when the potential of the transparent electrode 8 is higher than the potential of the transparent electrode 9. When the voltages $V_1$, $V_2$ and $V_3$ are applied to the metal electrodes 5, 6 and 7 with the relationships $V_1 > V_3 > V_2$, there are formed, on one side of the intersecting point K of the solid lines (i) and (ii), an area Ka where the potential of the second substrate 3 is higher than the potential of the first substrate 2 and, on the other side, an area Kb where the potential of the second substrate 3 is lower than the potential of the first substrate 2. In this instance, only the area Ka transmits therethrough light but the area Kb intercepts it. FIG. 2B shows the front elevation of the cell window in this state. In FIG. 2B reference numeral 41 indicates the light-transmitting area of the cell window and 42 the light-intercepting area. The operation (or the state) of the liquid crystal by (or in) which light is permitted to pass through a portion of the cell window as described above will hereinafter be referred to as the "diaphragming operation (or state)" and the ratio of the light-transmitting area to the total area of the cell window as the "aperture ratio". Further, the liquid crystal cell which is capable of controlling the aperture ratio of the cell window by the voltage gradient as mentioned above will hereinafter be called the gradient voltage drive liquid crystal cell.

The aperture ratio of the cell window can be changed by suitably selecting the voltages $V_1$, $V_2$ and $V_3$ in FIG. 2A, for example. When the voltage $V_3$ on the side of the first substrate 2, that is, the voltage which is applied to the transparent electrode 9, is decreased as indicated by the solid line (ii) in FIG. 2C, the intersecting point K of the solid lines (i) and (ii) shifts toward the electrode edge b, increasing the light-transmitting area 41 and decreasing the light-intercepting area 42. Conversely, when the voltage $V_3$ is increased in FIG. 2A, the light-transmitting area 41 decreases and the light-intercepting area 42 increases. It is apparent that the aperture ratio can also be varied by changing the values of the voltages $V_1$ and/or $V_2$ while keeping the voltage $V_3$ at a fixed value. Such a diaphragming operation of the cell window is not limited according to the type of the cell used but can be achieved for a birefringence controlling type liquid crystal cell, a TN type liquid crystal cell, a guest-host type liquid crystal cell, a two-frequency driving type liquid crystal cell, etc. as well as the ferroelectric liquid crystal cell.

In a light shutter in which a number of such gradient voltage drive liquid crystal cells 11 as shown in FIG. 1 are simply arrayed, it is necessary to provide wiring on the second substrate 3 for sending at least two kinds of drive voltage signals to each liquid crystal cell. This constitutes an obstacle to high density packaging of cell arrays. Moreover, at least two drivers must be provided for each gradient voltage drive liquid crystal cell; this also enlarges the scale of the light shutter and raises its cost accordingly.

SUMMARY OF THE INVENTION

It is an object of the present invention to provide a gradient voltage drive type liquid crystal cell array which does not require a large number of driving lines, and accordingly, can be driven with a small number of drivers.

Another object of the present invention is to provide a driving method suitable for such a liquid crystal cell array.

The liquid crystal cell array of the present invention includes: a first transparent substrate which has a plurality of first transparent electrodes and a plurality of individual cell drive lines for individually driving the first transparent electrodes; a second transparent substrate which has at least one second transparent electrode disposed opposite the first transparent electrodes and common-side electrodes provided on both sides of the second transparent electrode, the one common-side electrode being connected to a first common drive line and the other common-side electrode being connected to a second common drive line; and liquid crystal sealed in the space defined by the first and second transparent substrates. A plurality of cell windows of the liquid crystal cell array are defined by the respective opposed first and second transparent electrodes and the liquid crystal interposed therebetween.

According to the drive method for such a liquid crystal cell array, voltages of different magnitudes are applied to the first and second common drive lines to simultaneously develop substantially equal voltage gradients in the regions of the second transparent electrode constituting all the cell windows, and at the same time, voltages corresponding to individual pixel signals are applied to the individual cell drive lines, thereby controlling the aperture ratios of the respective cell windows. In the case where the liquid crystal cell array of the present invention employs two-frequency driving type liquid crystal cells, low- or high-frequency voltages of different magnitudes are applied to the first and second common drive lines connected to the two sides of the second transparent electrode, respectively, to thereby produce low- or high-frequency voltage gradients in the second transparent electrodes. At the same time, voltages corresponding to individual pixel signals are applied to the individual cell drive lines connected to the first transparent electrodes, respectively.

BRIEF DESCRIPTION OF THE DRAWINGS

FIG. 4B is a sectional view, corresponding to FIG. 4A, illustrating another embodiment of the liquid crystal cell array of the present invention;

FIG. 9 is a waveform diagram, for explaining an embodiment of the drive method of the present invention;

FIG. 10 is a waveform diagram, for explaining another embodiment of the drive method of the present invention;

FIG. 13 is a waveform diagram, for explaining another embodiment of the drive method of the present invention;

FIG. 14 is a waveform diagram, for explaining another embodiment of the drive method of the present invention;

FIG. 15 is a waveform diagram, for explaining in detail the waveform diagram shown in FIG. 14;

FIG. 19 is a waveform diagram, for explaining a modification of the drive method described with regard to FIG. 18;

FIG. 20 is a waveform diagram, for explaining yet another embodiment of the drive method of the present invention;

DESCRIPTION OF THE PREFERRED EMBODIMENTS

Figure 3A:
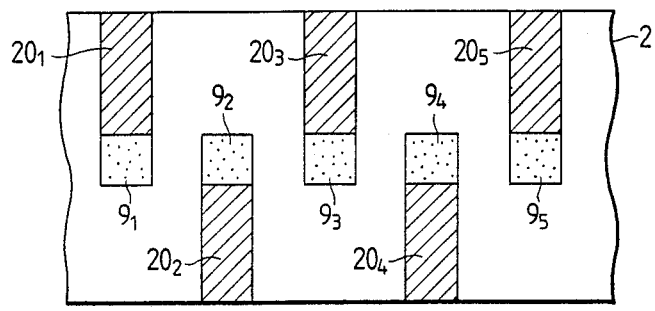
FIGS. 3A and 3B are diagrams schematically showing the structures of first and second transparent substrates forming the liquid crystal cell array of the present invention.
Figure 3B:
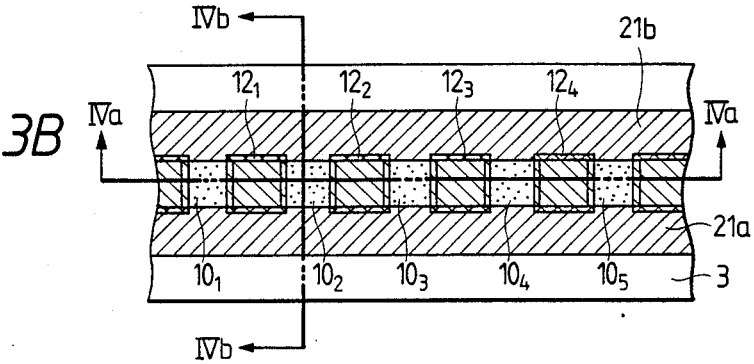

FIG. 3A is a plan view showing a first transparent substrate 2 of the liquid crystal cell array of the present invention, a plurality of first transparent electrodes $9_1$, $9_2, \ldots$ formed on the first transparent substrate 2 and individual cell drive lines $20_1, 20_2, \ldots$ connected to the first transparent electrodes. FIG. 3B is a plan view showing a second transparent substrate 3 of the liquid cell array, a plurality of second transparent electrodes $10_1, 10_2, \ldots$ formed on the second transparent substrate 3 and first and second common drive lines 21a and 21b for applying voltages to both sides of the transparent electrodes at the same time.

Figure 4A:
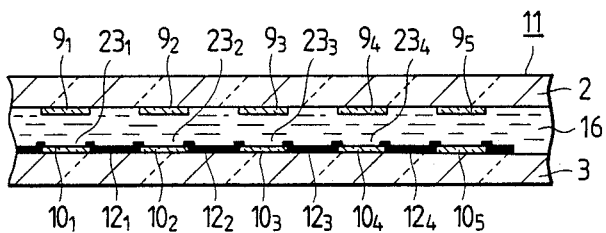
FIGS. 4A and 4B are a longitudinal-sectional view taken on the broken line 1V$a$—1V$a$ and a cross-sectional view taken on the broken line 1V$b$—1V$b$ in FIG. 3B.

The first transparent electrodes $9_1, 9_2, \ldots$ substantially square in shape are arranged side by side on the first substrate 2 at regular intervals, and the individual cell drive lines $20_1, 20_2, \ldots$ made of metal are connected to the first transparent electrodes $9_1, 9_2, \ldots$ at one marginal edge thereof. In this example, the drive lines $20_1$, $20_2, \ldots$ extend at right angles to the direction of arrangement of the first transparent electrodes $9_1, 9_2, \ldots$ and in opposite directions alternately. On the second transparent substrate 3 the second transparent electrodes $10_1, 10_2, \ldots$, also substantially square in shape, are arranged side by side at regular intervals so that they are opposed to the first transparent electrodes $9_1$, $9_2, \ldots$, respectively. On the second transparent substrate 3 there are further provided the first common drive line 21a which is made of metal and extends along marginal edges of the second transparent electrodes $10_1$, $10_2, \ldots$ on the same side, for interconnecting them, and the second common drive line 21b which is also made of metal and extends along marginal edges of the second transparent electrodes $10_1, 10_2, \ldots$ on the opposite side from the first common drive line 21a, for interconnecting them. These metal drive lines $20_1, 20_2, \ldots$ and 21a, 21b are formed so that they also serve as metal electrodes of the transparent electrodes $9_1, 9_2, \ldots$ and $10_1$, $10_2, \ldots$ Moreover, there are formed on the second transparent substrate 3 light shielding layers $12_1, 12_2, \ldots$ for shielding from light those areas between adjacent second transparent electrodes. The light shielding layers $12_1, 12_2, \ldots$ are formed in the following manner: At first, gelatin containing a black dye is coated about 1 μm thick over the entire area of the top surface of the second transparent substrate 3 including the first and second common drive lines 21a and 21b and the second transparent electrodes $10_1, 10_2, \ldots$ and is then selectively removed by photoetching into a desired pattern to form windows $23_1, 23_2, \ldots$ on the transparent electrodes $10_1, 10_2, \ldots$ (FIG. 4A).

Figure 4B:
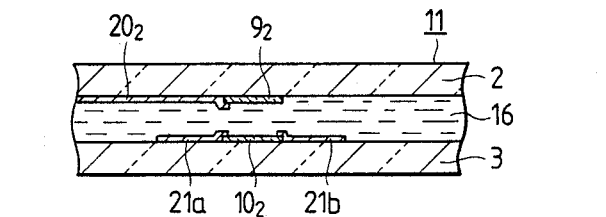

The first and second transparent substrates 2 and 3 shown in FIGS. 3A and 3B are assembled together in parallel, adjacent but spaced relation so that the first and second transparent electrodes $9_1, 9_2, \ldots$ and $10_1$, $10_2, \ldots$ are opposed to each other across a gap defined therebetween by a spacer (not shown) disposed between the first and second substrates 2 and 3. The gap defined between the first and second transparent substrates 2 and 3 thus assembled is filled with liquid crystal 16. FIGS. 4A and 4B are a longitudinal-sectional view and a cross-sectional view of the gradient voltage driving type liquid crystal cell array 11 thus constructed, showing the sections along the broken lines 1Va—1Va and 1Vb—1Vb in FIG. 3B, respectively.

Figure 4C:
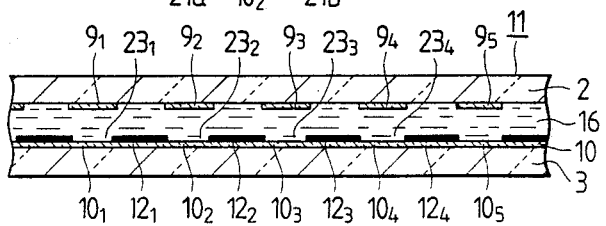

While in the above embodiment the substantially square, spaced-apart second transparent electrodes $10_1$, $10_2, \ldots$ are formed on the second transparent substrate 3, it is also possible to define the second transparent electrodes $10_1, 10_2, \ldots$ by forming a stripe of transparent electrode 10 on the second transparent substrate 3 and then forming, on the electrode 10, light shielding layers $12_1, 12_2, \ldots$ in the same pattern as shown in FIG. 3B. FIG. 4C is a sectional view, corresponding to FIG. 4A, of the liquid crystal cell array in the above case. The formation of a mask pattern for obtaining such a stripe of transparent electrode 10 is easier than the formation of a mask pattern for providing the spaced-apart transparent electrodes $10_1, 10_2, \ldots$, and the former affords the reduction of size accuracy and positioning accuracy of the light shielding layers $12_1, 12_2, \ldots$ which are formed on the stripe-shaped transparent electrode 10. Consequently, the production yield rate of the liquid crystal cell array can be improved.

In order to drive the gradient voltage driving type liquid crystal cell array 11 of the present invention, it is necessary to apply voltage across each of the second transparent electrodes $10_1, 10_2, \ldots$ to create a voltage gradient. When the applied voltage is constant, a decrease in the electric resistance of each second transparent electrode will cause an increase in the amount of heat generated therein, and it is therefore preferable that the second transparent electrodes $10_1, 10_2, \ldots$ be high in electric resistance. However, the electric resistance needs to be sufficiently lower than the impedance of the liquid crystal 16 sealed in the cell 11. From the practical point of view, the electric resistance of the second transparent electrodes $10_1, 10_2, \ldots$ may preferably be in the range of about $10^8$ to $10^5$ $\Omega$/sq. On the other hand, the electric resistance of each of the first transparent in the electrodes $9_1, 9_2, \ldots$ is selected sufficiently lower than the resistance of the second transparent electrode, approximately 50 $\Omega$/sq in practice, so that the voltage applied to each first transparent electrode is uniformly distributed over the entire area thereof.

As noted previously, ferroelectric liquid crystal, TN liquid crystal, two-frequency drive liquid crystal, etc. are usable for the gradient voltage drive type liquid crystal cell array of the present invention shown in FIGS. 3A, 3B, 4A and 4B. In the case of the ferroelectric liquid crystal, however, if each drive signal is accompanied by a reverse polarity signal for charge cancellation use so as to protect the liquid crystal from deterioration, then the orientation of ferroelectric liquid crystal molecules will be reversed during the application of the reverse polarity signal. Accordingly, the light source for irradiating the light shutter must be kept OFF in this time period. A special device is needed for such control of the light source, and this also poses a problem of cost. The TN liquid crystal responds to voltage application relatively quickly in 0.1 to 10 milliseconds but its response speed to the removal of the applied voltage is as low as tens to hundreds of milliseconds. Consequently, the TN liquid crystal is not suitable for high-speed driving of the light shutter.

Figure 5:
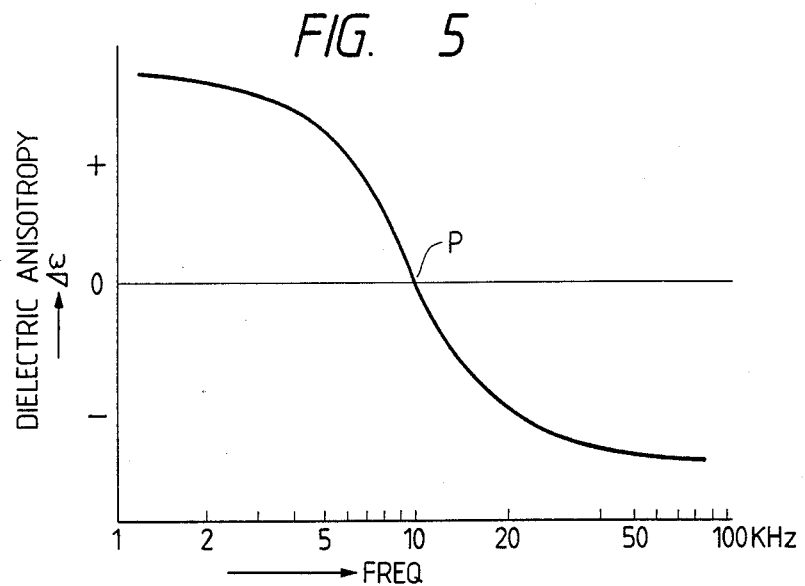
FIG. 5 is a graph showing a drive voltage frequency versus dielectric anisotropy characteristic of a two-frequency drive type liquid crystal.

On the other hand, the two-frequency drive liquid crystal is voltage-controlled birefringence (ECB) type liquid crystal, and, for example, as shown in FIG. 5, it exhibits a positive dielectric anisotropy when the frequency of the applied voltage is lower than a point P and exhibits a negative dielectric anisotropy when the frequency is higher than the point P. The point P of such a transition will hereinafter be referred to as the transition point. Frequency higher than the point P and frequency lower than the point P will hereinafter be referred to simply as high-frequency and low-frequency, respectively. The application of low-frequency voltage will provide homeotropic alignment (vertical alignment) of the liquid crystal molecules and the application of high-frequency voltage will provide homogeneous alignment (horizontal alignment) of the molecules. In addition, the response time of this liquid crystal to switching between high and low frequency voltages can be as short as hundreds of microseconds, though depending on the magnitude of the applied voltage. This two-frequency drive liquid crystal is disclosed in, for example, Bak, Ko and Labes, "Fast decay in twisted nematic induced by frequency switching", Journal of Applied Physics, Vol. 46, No. 1, Jan. 1975.

It is therefore considered that the two-frequency drive liquid crystal is suitable for use in the light shutter which is required to be driven at high speed. The principle of driving the gradient voltage drive liquid crystal cell array of the present invention, in the case of employing the two-frequency drive liquid crystal, will be described first in connection with a single liquid crystal cell.

Figure 6:
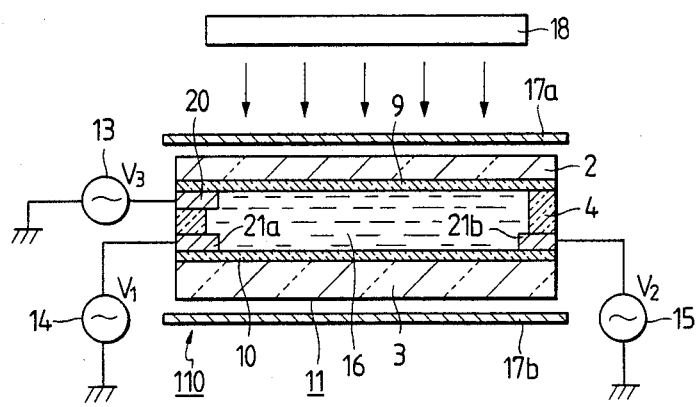
FIG. 6 is a diagram schematically showing the structure of a light shutter employing the liquid crystal cell array of the present invention.

FIG. 6 schematically illustrates, in section, a light shutter 110 formed by a gradient voltage drive liquid crystal cell 11, and this sectional view corresponds to that depicted in FIG. 4B. On the inner surface of the first transparent substrate 2 there are provided the first transparent electrode 9 and the metal electrode 20 connected thereto, and on the inner surface of the second transparent substrate 3 there are provided the second transparent electrode 10 and the metal electrodes 21a and 21b connected to its both marginal sides. The first and second transparent substrates 2 and 3 are assembled together in parallel, adjacent but spaced relation, with the spacer 4 sandwiched therebetween. A pair of polarizing plates 17a and 17b are disposed on both sides of the liquid crystal cell 11, with their planes of polarization held at right angles to each other. Disposed behind the polarizing plate 17a as a light source 18. The electrodes 20, 21a 21b are connected to AC voltage generators 13, 14 and 15, respectively. Any of these AC voltage generators 13, 14 and 15 can generate an arbitrary voltage at an arbitrary frequency and in an arbitrary phase. Let it be assumed here that the AC voltage generators 14 and 15 are generating AC voltage at the same frequency and in the same phase.

The operation starts with closing the light shutter 110 by grounding the AC voltage generators 13 ($V_3=0$) and causing the AC voltage generators 14 and 15 to yield low-frequency voltages $V_1(L)$ and $V_2(L)$ lower than the transition point P shown in FIG. 5. Consequently, the liquid crystal molecules assume the homeotropic alignment and linearly polarized light having passed through the polarizing plate 17a passes through the liquid crystal cell 11, but it is intercepted by the polarizing plate 17b set in the state of cross-nicol. In other words, the light shutter 110 is in the closed state, i.e. in the light intercepting state. Conversely, even if the AC voltage generator 13 generates a low-frequency voltage and the AC voltage generators 14 and 15 are grounded, the light shutter 110 similarly intercepts light.

Figure 2A:
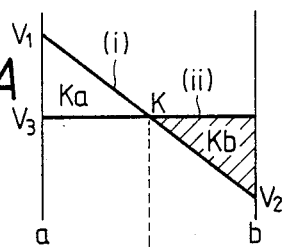
FIGS. 2A, 2B, 2C and 2D are diagrams, for explaining the principle of operation of the liquid crystal cell depicted in FIG. 1.
Figure 2C:
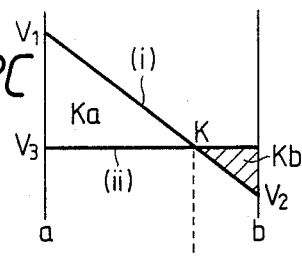
Figure 2B:
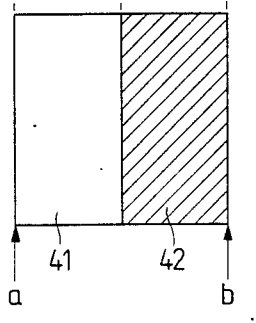
Figure 2D:
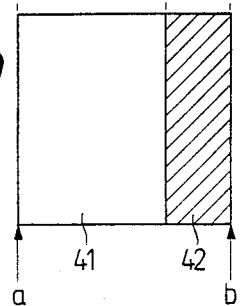

Next, the light shutter 110 is opened with a desired aperture ratio. By causing the AC voltage generator 13 to produce the low-frequency voltage $V_3(L)$ and the AC voltage generators 14 and 15 to produce high-frequency voltages $V_1(H)$ and $V_2(H)$ higher than the transition point P, with relationships $V_1(H) \geq V_3(L) \geq V_2(H)$, there will be performed a diaphragming operation similar to that described previously with respect to FIGS. 2A and 2B. As shown in the voltage distribution diagram of FIG. 7, a gradient by the high-frequency voltage which decreases from the electrode 21a toward the electrode 21b, as indicated by the broken line (i), is created relative to the low-frequency voltage $V_3(L)$ indicated by the solid line (II). In this instance, the region where the low-frequency voltage $V_3(L)$ is lower than the high-frequency voltage becomes the light transmitting region 41 and the region where the low-frequency voltage $V_3(L)$ is higher than the high-frequency voltage becomes a light intercepting region 42. By changing the magnitude of the low-frequency voltage $V_3(L)$ which is created by the AC voltage generator 13, the point of intersection of the solid line (ii) with the broken line (i) is shifted, that is, the area of the light transmitting region 41 can freely be changed. By increasing the low-frequency voltage $V_3(L)$ so that $V_3 \geq V_1(H)$, the light shutter 110 is fully closed, whereas, by decreasing the low-frequency voltage $V_3(L)$ so that $V_2(H) \geq V_3$, the light shutter 110 is fully opened.

Figure 7:
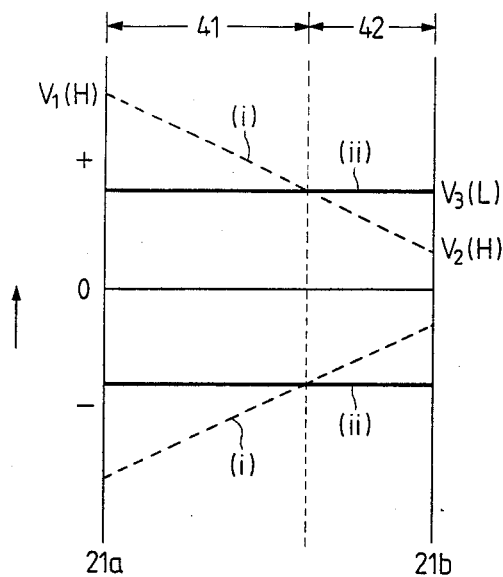
FIG. 7 is a diagram, for explaining the principle of the drive method of the present invention.

Although in the above example the low-frequency voltage $V_3(L)$ is applied to the electrode 20 and the high-frequency voltage $V_1(H)$ and $V_2(H)$ are applied to the electrodes 21a and 21b, respectively, the diaphragming operation is performed even in the case where a high-frequency voltage $V_3(H)$ is applied to the electrode 20, low-frequency voltages $V_1(L)$ and $V_2(L)$ are applied to the electrodes 21a and 21b, and the voltages are controlled in the range of $V_1(L) \geq V_3(H) \geq V_2(L)$ so that the relationship between the low- and high-frequency voltages is reversed in FIG. 7. The former method will hereinafter be referred to as the high-frequency gradient drive method and the latter method as the low-frequency gradient drive method. In the manner described above, the light shutter 110 can be driven to quickly perform the diaphragming operation at desired timing to provide the light transmitting region 41 of a desired area.

Figure 8:
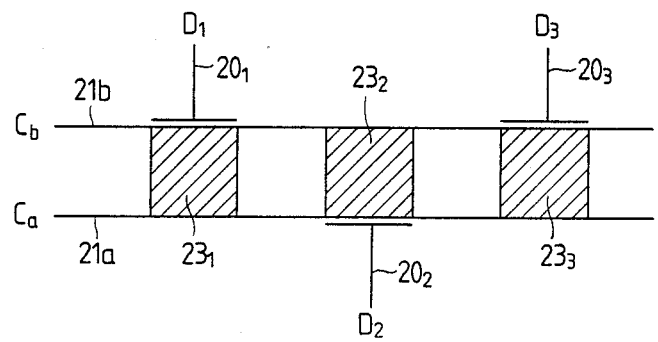
FIG. 8 is a diagram schematically showing the liquid cell array structure, for explaining various embodiments of the drive method of the present invention.

In the following, some embodiments of the two-frequency drive method according to the present invention will be described using the liquid crystal cell arrays shown in FIGS. 3A, 3B, 4A and 4C. To facilitate an easy understanding of the relationships between an array of liquid crystal cells and the drive signals which are applied thereto, there is shown in FIG. 8 the liquid crystal cell array in a symbolic form. In FIG. 8, reference numerals $23_1$, $23_2$ and $23_3$ indicate regions which permits the passage therethrough of light, that is, cell windows defined in the first transparent electrodes $9_1$, $9_2$ ... and the opposing second transparent electrodes $10_1$, $10_2$, ... by the edges of the drive lines $21a$ and $21b$ and the light shielding layers $12_1$, $12_2$, ... The opening, closing and diaphragming operations of the cell windows $23_1$, $23_2$ and $23_3$ are controlled by signals $D_1$, $D_2$, and $C_a$, $C_b$ which are applied to the individual cell drive lines $20_2$, $20_2$, $20_3$, and the common drive lines $21a$ and $21b$, respectively.

[Drive Method-1]

The high-frequency gradient drive method will be described first.

In FIG. 9, $C_a$ and $C_b$ are voltage waveforms of common drive signals which are provided to the common drive lines $21a$, and $21b$ in FIG. 8; $D_1$, $D_2$ and $D_3$ shows, by way of example, voltage waveforms of pixel signals which are provided to the individual cell drive lines which are provided to the individual cell drive lines $20_1$, $20_2$ and $20_3$ in FIG. 8; and F shows a sequence of modes of operation of the liquid cell array.

In an initial close mode period $S_1$ during which the cell windows $23_1$, $23_2$ and $23_3$, all remain closed, low-frequency voltage waveforms $C_a$ and $C_b$ of the same wave height are input in an in-phase relation, whereas the voltage waveforms $D_1$, $D_2$ and $D_3$ are held at zero volt.

In the next diaphragm mode period $I_1$ during which at least one of the cell windows $23_1$, $23_2$ and $23_3$, is placed in its diaphragmed state, a high-frequency, high voltage $V_a$ and a high-frequency, low voltage $V_b$ are applied as the waveforms $C_a$ and $C_b$, respectively. The high-frequency voltages are each indicated by a block with a cross marked therein. Further, low-frequency voltages $V_1$, $V_2$ and $V_3$ each corresponding to a pixel signal are applied as the waveforms $D_1$, $D_2$ and $D_3$, respectively. In this example, the low-frequency voltage $V_3$ is zero and the values of the low-frequency voltages $V_1$ and $V_2$ are intermediate between the high-frequency voltages $V_a$ and $V_b$.

In the period $I_1$ the high-frequency voltage gradient is developed in all of the cell windows $23_1$, $23_2$ and $23_3$. In this instance, the cell window $23_3$, is not supplied with the low-frequency voltage $V_3$, and hence permits the passage therethrough of light over the entire area thereof (i.e. fully opened). On the other hand, in the cell windows $23_1$ and $23_2$ supplied over the entire window areas thereof with the low-frequency voltages $V_1$ and $V_2$, respectively, such a voltage distribution as shown in FIG. 7 is provided because of the high-frequency voltage gradient. Consequently, the cell windows $23_1$ and $23_2$ are placed in the diaphragmed state. Since the low-frequency voltage $V_1$ of the waveform $D_1$ is higher than the low-frequency voltage $V_2$ of the waveform $D_2$, the light transmitting region 41 of the cell window $23_1$ is larger in area than the light transmitting region 41 of the cell window $23_2$. When the low-frequency voltage $V_1$ of the waveform $D_1$ becomes higher than the high-frequency voltage $V_a$ of the waveform $C_a$, the cell window $23_1$ intercepts light over the entire area thereof (i.e. fully closed).

Next, when the liquid cell array enters a close mode $S_2$, the cell windows $23_1$, $23_2$ and $23_3$, are all switched to the light intercepting state, for they are supplied with the low-frequency voltages of the waveforms $C_a$ and $C_b$ alone as in the initial close mode $S_1$. Also in this case, the switching from the diaphragmed state to the light intercepting state is performed at high speed.

Next, the low-frequency gradient drive method will be described.

In FIG. 10, $C_a$ and $C_b$ are voltage waveforms of common drive signals which are applied to the common drive lines $21a$ and $21b$ in FIG. 8; $D_1$, $D_2$ and $D_3$ show, by way of example, voltage waveforms of pixel signals which are applied to the individual cell drive lines $20_1$, $20_2$ and $20_3$ in FIG. 8; and F shows a sequence of modes of operation of the liquid cell array.

In the initial close mode period $S_1$ during which the cell windows $23_1$, $23_2$ and $23_3$, are all in the closed state, low-frequency voltages of the waveforms $C_a$ and $C_b$ are applied in the same phase and at the same wave height, whereas the voltage waveforms $D_1$, $D_2$ and $D_3$ are held at zero volt.

In the next diaphragm mode period $I_1$ in which at least one of the cell windows $23_1$, $23_2$ and $23_3$, is placed in the diaphragmed state, a low-frequency, high voltage $V_a$ and a low-frequency, low voltage $V_b$ are applied as the waveforms $C_a$ and $C_b$, respectively. Further, high-frequency voltages $V_1$, $V_2$ and $V_3$ each corresponding to a pixel signal are applied as the waveforms $D_1$, $D_2$ and $D_3$, respectively. In this example, however, the high-frequency voltage $V_3$ is zero and the wave heights of the high-frequency voltages $V_1$ and $V_2$ are both selected intermediate between the low-frequency voltages $V_a$ and $V_b$.

In the period $I_1$ the low-frequency voltage gradient is developed in every cell window, but the cell window $23_3$, is supplied with the low-frequency voltages $V_a$ and $V_b$ alone, and hence inhibits the passage therethrough of light over the entire area thereof (i.e. fully closed). On the other hand, in the cell windows $23_1$ and $23_2$ supplied uniformly over the entire window areas thereof with the high-frequency voltages $V_1$ and $V_2$ of the waveforms $D_1$ and $D_2$ there is provided the low-frequency voltage gradient, and accordingly, the cell windows $23_1$ and $23_2$ are placed in the diaphragmed state. Since the high-frequency voltage of the waveform $D_1$ is higher than the high-frequency voltage $V_2$ of the waveform $D_2$, the light transmitting region 41 of the cell window $23_1$ is larger in area than the light transmitting region 41 of the cell window $23_2$. When the high-frequency voltage $V_1$ of the waveform $D_1$ exceeds the low-frequency voltage $V_a$ of the waveform $C_a$ at that time, the cell window $23_1$ permits the passage therethrough of light over the entire area thereof (i.e. fully opened).

Next, when the liquid crystal cell array enters the close mode $S_2$ after the diaphragm mode $I_1$, the cell windows $23_1$, $23_2$ and $23_3$, are all switched to the light intercepting state, for they are supplied with the low-frequency voltages of the waveforms $V_a$ and $V_b$ alone as in the initial close mode period $S_1$. Also in this instance, the switching from the diaphragmed state to the light intercepting state is performed at high speed.

While in the above the aperture ratio of each cell window during the diaphragming operation is controlled by controlling the wave height of each applied voltage, it is also possible to change the aperture ratio by changing the pulse width (i.e. the duty cycle) of the high-frequency voltage while keeping the applied voltage constant. In other words, the control of the diaphragming operation depends on the effective value of the applied voltage as well as on its amplitude. A pulse width control method is therefore applicable to the drive methods described above.

The method of changing the area of the light transmitting region by controlling the essential voltage application time, as mentioned above, permits easy control by digital circuitry because it utilizes voltage of a fixed wave height. On this account, drive circuitry used is simpler than in the case of changing the aperture ratio by voltage control.

[Drive Method-2]

In any of the drive methods described above with respect to FIGS. 9 and 10, any of the bipolar voltage waveforms $D_1$, $D_2$ and $D_3$ of pixel signals is required to be a waveform which is a combination of signals of three levels, i.e. 0 volt, a positive voltage and a negative voltage. However, the three-level signal poses a problem as it necessitates the use of a more complicated drive circuit than is required for a two-level signal which is a combination of a positive signal and 0 volt or positive and negative signals. This disadvantage is not particularly serious when the number of drive circuits used is small, but its influence is great when the liquid cell array has hundreds of cell windows or more. Then, a description will be given, with reference to FIG. 11, of a diaphragm control using unipolar signals which affords economization of the drive circuitry.

Figure 11:
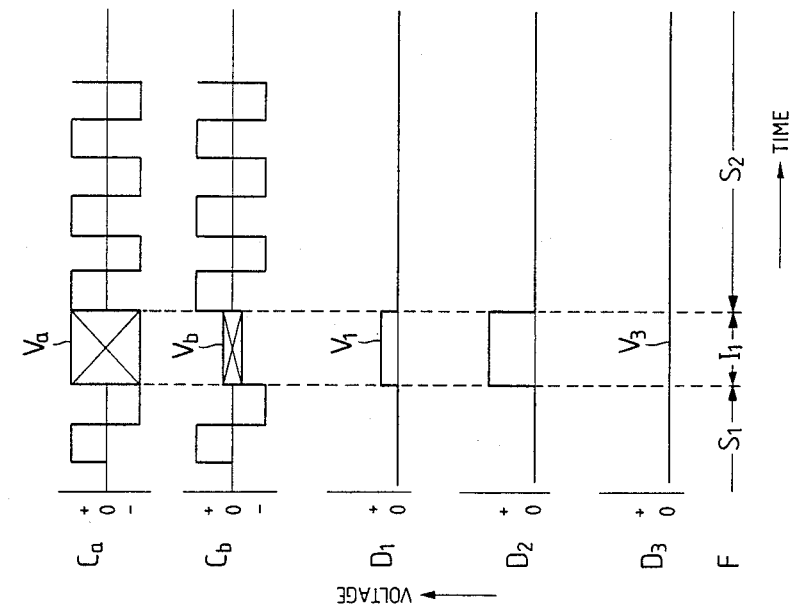
FIG. 11 is a waveform diagram, for explaining another embodiment of the drive method of the present invention.

In FIG. 11, $C_a$ and $C_b$ are voltage waveforms which are applied to the common drive lines 21a and 21b in FIG. 8; $D_1$, $D_2$ and $D_3$ show, by way of example, unipolar voltage waveforms which are applied to the individual cell drive lines $20_1$, $20_2$ and $20_3$ in FIG. 8; and F shows a sequence of modes of operation of the liquid cell array depicted in FIG. 8.

In the initial close mode period $S_1$ in which the cell windows $23_1$, $23_2$ and $23_3$, are all in the closed state, low-frequency voltages of bipolar waveforms $C_a$ and $C_b$ are applied in the same phase, but the voltage waveforms $D_1$, $D_2$ and $D_3$ are held at zero volt. In the next diaphragm mode period $I_1$ in which at least one cell window $23_1$ is diaphragmed, the cell window $23_2$ is fully closed and the cell window $23_3$, is fully opened. As in the case of FIG. 9, bipolar high-frequency voltages $V_a$ and $V_b$ of different values are applied as the voltage waveforms $C_a$ and $C_b$, forming the high-frequency voltage gradient. Further, unipolar low-frequency voltages $V_1$ and $V_2$ are applied as the voltage waveforms $D_1$ and $D_2$ In this example, $V_a > V_1 > V_b$. On the other hand, the voltage $V_2$ is selected higher than or equal to the voltage $V_a$. As a result of this, in the period $I_1$ the cell window $23_1$ is placed in the diaphragmed state, the cell window $23_2$ is placed in the light intercepting state because the low-frequency voltage $V_2$ is higher than the high-frequency voltage $V_a$, and the cell window $23_3$ is placed in the light transmitting state because all the signals input thereto are high-frequency.

In the next close mode period $S_2$ in which the cell windows $23_1$, $23_2$ and $23_3$, are closed, they are all switched to the light intercepting state at high speed as in the case of FIG. 9.

[Drive Method-3]

Incidentally, since the drive methods described above in connection with FIGS. 9 and 10 utilize the bipolar voltage waveforms $D_1$, $D_2$ and $D_3$ as pixel signals, the voltage waveforms which are applied to the liquid crystal in each cell of the liquid crystal cell array constitute an AC voltage with no polarity deviation when they are averaged, and consequently, there is no fear of deteriorating the liquid crystal. In the case of using such unipolar voltage waveforms $D_1$, $D_2$ and $D_3$ as described above with regard to FIG. 11, however, the polarity of the voltage which is applied to the liquid crystal in the liquid crystal cell deviates to a particular one of the positive and negative polarities for each diaphragming operation. As a result of this, the liquid crystal may be deteriorated and its lifetime may become shorter than in the case of driving the liquid cell by such polarity-deviation-free voltage waveforms as described previously in respect of FIGS. 9 and 10. In addition, the area of the light transmitting region 41 varies instably during high-speed operation. This problem can be solved by a suitable selection of the voltage waveform which is applied to the liquid crystal.

Figure 12:
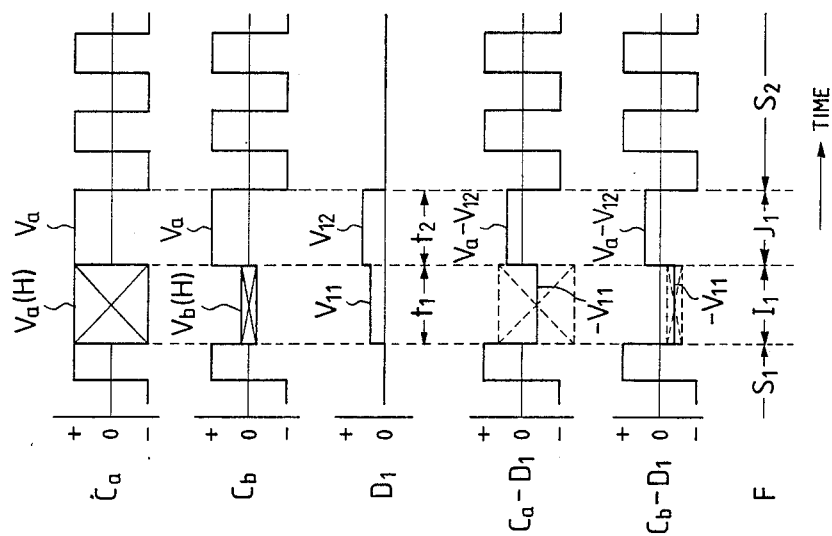
FIG. 12 is a waveform diagram, for explaining another embodiment of the drive method of the present invention.

FIG. 12 shows the voltage waveforms $C_a$ and $C_b$ which are provided to the common drive lines 21a and 21b in FIG. 8, a unipolar voltage waveform $D_1$ which is provided to the individual cell drive line $20_1$, and composite voltage waveforms $C_a$-$D_1$ and $C_b$-$D_1$ which are applied across the liquid crystal at the marginal portions of the cell window $23_1$ near the common drive lines 21a and 21b. In FIG. 12, F shows a sequence of modes of operation of the cell array. The composite waveforms $C_aD_1$ and $C_bD_1$ in the diaphragm mode period $I_1$ are indicated by the combination of broken line and solid line so as to distinguish the polarity deviations from the high-frequency voltages $V_a(H)$ and $V_b(H)$.

In the periods $S_1$ and $S_2$ the voltage waveforms $C_a$ and $C_b$ are fixed at low-frequency voltages equal to each other and the composite voltage waveforms $C_a$-$D_1$ and $C_b$-$D_1$ which are provided to the liquid crystal of the cell window $23_1$ assume the same waveforms as those of the voltages $C_a$ and $C_b$. Consequently, the cell window $23_1$ is in the light intercepting state. In the period $I_1$ the voltage waveforms $C_a$ and $C_b$ are high-frequency as in the case of FIG. 11 and a unipolar (positive in this example) intermediate voltage $V_1$ is provided as the voltage waveform $D_1$ for performing the diaphragming operation. In this example $V_a(H) > V_1 > V_b(H)$. A period indicated by $J_1$ is a polarity deviation compensate mode period, in which an identical unipolar voltage $V_a$ is applied to either of the common drive lines 21a and 21b, and the voltage waveform $D_1$ is provided as a unipolar voltage $V_{12}$ which is of the same polarity (i.e. positive) as the unipolar voltage $V_{11}$ in the preceding period $I_1$ and has a fixed time width. In this example, the voltages $V_a$, $V_1$ and $V_{12}$ are selected so that $V_a - V_{12} = V_1$ and, therefore, the time width of the period $J_1$ is equal to the period $I_t$.

With such a method, the effective voltages of the composite waveforms $C_a$-$D_1$ and $C_b$-$D_1$, which are provided to the liquid crystal of the cell window $23_1$ at its marginal portions near the common drive lines 21a and 21b, are symmetric in the periods $I_1$ and $J_1$ as indicated by the solid lines, and consequently, the polarity deviation in the diaphragming mode period $I_1$ is compensated for in the period $J_1$. Since the polarity deviation caused by the unipolar drive voltage $V_1$ in the period $V_1$ is uniform over the entire area of the cell window $23_1$, the polarity deviation can be compensated for over the entire area of the cell window $23_1$.

Although in the above the voltages $V_a$ and $V_{12}$ for compensating for the polarity deviation of the waveforms $C_a$, $C_b$ and $D_1$ are described to be set in the same period $J_1$ with a view to facilitating an easy understanding of the description, the same compensating effect could be obtained by providing the compensating voltages $V_a$ and $V_{12}$ in different time slots. In this case, it is necessary only that the product of the effective voltage ($V_{11}$) applied to the liquid crystal in the period $I_1$ and its duration ($t_1$) be equal in absolute value to and reverse in sign from the product of the voltage ($V_a-V_{12}$) applied to the liquid crystal in the period $J_1$ and its duration ($t_2$). Even if the voltages $V_{11}$ and ($V_a-V_{12}$) and the durations $t_1$ and $t_{11}$ are respectively different from each other the same effect as mentioned above can be obtained so long as the voltage-time products are equal to each other.

[Drive Method-4]

According to the above-described drive method-3, it is necessary to provide the compensating period J in the time slot of each of the voltage waveforms $C_a$, $C_b$ and $D_1$ as shown in FIG. 12 and apply the compensating signals in that period so as to eliminate the polarity deviation of the voltages applied to the liquid crystal. This introduces the necessity of decreasing the rate of supply of pixel signals, that is, $D_1$, $D_2$ and $D_3$, to the liquid crystal cell array accordingly. Next, a description will be given, with reference to FIGS. 8 and 13, of a liquid crystal cell array drive method which eliminates the polarity deviation of applied voltages by use of unipolar pixel signals, without the necessity of independently providing the compensating period.

The drive method, which employs waveforms shown in FIG. 13, is the high-frequency voltage gradient drive method, and the aperture ratios of the cell windows $23_1$, $23_2$ and $23_3$, can arbitrarily be varied by controlling the timing of the unipolar pixel signals $D_1$, $D_2$ and $D_3$ which are provided to the individual cell drive lines $20_1$, $20_2$ and $20_3$ FIG. 13 shows, however, an example of driving only the cell window $23_1$. Common drive voltage waveforms $C_a$ and $C_b$ are provided to the common drive lines $21a$ and $21b$. The voltage waveforms $C_a$ and $C_b$ in each of the periods $I_1$ and $I_2$ are equivalent to waveforms which are obtained by dividing the corresponding high-frequency voltage waveforms of FIG. 9 in each of the periods $I_1$ and $I_2$ into former and latter halves of the same length and by biasing one of them, the former half in this example, with a voltage equal to the voltage $V_1$ (which is selected equal to the voltage $V_a$, in this example) of the unipolar individual cell drive signal waveform $D_1$ in the same polarity. Further, high-frequency voltages $V_a(H)$ and $V_b(H)$ in the voltage waveforms $C_a$ and $C_b$ and the voltage $V_1$ ($=V_a$) are predetermined fixed values which satisfy the relationship $V_a>=V_a(H)>V_b(H)$.

In FIG. 13, $S_1$, $S_2$ and $S_3$ are close mode periods in which the cell windows $23_1$, $23_2$, ... are all closed and these cell windows are not supplied with the pixel signal voltage waveform $D_1$ but supplied with only the same low-frequency voltage waveforms $C_a$ and $C_b$ via the common drive lines $21a$ and $21b$. The periods $I_1$, $I_2$ and $I_3$ are diaphragm mode periods in which the aperture ratios of the cell windows $23_1$, $23_2$, ... are controlled as desired. As shown in the period $I_1$, the cell drive pixel signal ($D_1$) is generated at the timing of the latter half of the afore-mentioned high-frequency voltage waveform divided into two. A composite voltage waveform which is applied to the liquid crystal near the common drive line $21a$ and a composite voltage waveform which is applied to the liquid crystal near the common drive line $21b$ are depicted as voltage waveforms $C_a$-$D_1$ and $C_b$-$D_1$ in the period $I_1$. The composite voltage waveforms in the period $I_1$ take such a form that the high-frequency voltage waveforms of the voltages $V_a(H)$ and $V_b(H)$ are biased by the low-frequency voltage waveform of the voltage $V_a$, and the voltages are selected so that $V_a>=V_a(H)>V_b(H)$. Consequently, the cell window $23_1$ is fully closed. On the other hand, in the period $I_2$ the pixel signal $D_1$ is produced at the timing of the former half of the aforementioned high-frequency voltage waveform split into two. In consequence, the composite voltage waveforms which are provided to the liquid crystal of the cell window $23_1$ are only high-frequency voltages as shown in the period $I_2$ of the voltage waveforms $C_a$-$D_1$ and $C_b$-$D_1$, so that the cell window $23_1$ is fully opened. In the period $I_3$ the timing for generating the cell drive pixel signal $D_1$ is selected at any desired location in a range covering both the first and second halves of the high-frequency voltage waveform split into two. As a result, the composite voltage waveforms $C_a$-$D_1$ and $C_b$-$D_1$ are each a combination of periods $T_1$ and $T_3$ in which the high-frequency voltage waveform is biased by the low-frequency voltage and periods $T_2$ and $T_4$ in which they are not biased by the low-frequency voltage, as shown in the period $I_3$. Consequently, the mean effective voltage which is applied to the liquid crystal of the cell window $23_1$ near the common drive line $21a$ in the period $I_3$ is mainly a relatively large high-frequency voltage, opening the cell window $23_1$. On the other hand, the mean effective voltage which is applied to the liquid crystal of the cell window $23_1$ near the common drive line $21b$ in the period $I_3$ is mainly the low-frequency voltage, closing the cell window $23_1$. In the cell window $23_1$ this effective high-frequency voltage gradually decreases from the common drive line $21a$ toward the line $21b$, and on the other side of a certain boundary line, the effective low-frequency voltage is predominant. The position of this boundary line can freely be selected by continuously changing the timing position of the pixel signal $D_1$ from the position of the first half to the latter half of the two-split high-frequency voltage waveform. In this way, the diaphragming operation of controlling the aperture ratio of the cell window $23_1$ is performed in the period $I_3$.

[Drive Method-5]

Referring now to FIGS. 8, 14 and 15, another liquid crystal cell array drive method using a different unipolar pixel signal will be described in connection with one cell window $23_1$. This method utilizes the low-frequency voltage gradient method. The common voltage waveforms $C_a$ and $C_b$ which are supplied to the common drive lines $21a$ and $21b$ are composed of low-frequency voltage waveforms (indicated by the thick lines in FIG. 14) and a unipolar high-frequency voltage $V(H)$ of a fixed wave height (indicated by a block marked with a cross therein in the diaphragm mode periods $I_1$, $I_2$ and $I_3$) superimposed thereon. On the other hand, the voltage waveforms of pixel signals which are applied to the individual cell drive lines $20_1$, $20_2$, ... are each the same unipolar high-frequency voltage waveform as the high-frequency voltage $V(H)$ superimposed on the voltage waveforms $C_a$ and $C_b$, as typically indicated by $D_1$. In this example, $\overline{V}(H)$ is a voltage waveform delayed by a phase angle of 180° relative to the high-frequency voltage waveform $V(H)$. In the diaphragm mode periods $I_1$, $I_2$ and $I_3$ the cell window $23_1$ is placed in the opened, closed and medium-diaphragmed states, respectively. The operations therefor will be described with reference to FIG. 15. In FIG. 15 there are not shown the voltage waveform $C_b$ and the composite waveform $C_b$-$D_1$ of the voltage waveform $C_b$ and the individual cell drive voltage waveform $D_1$.

In the diaphragm mode period $I_1$ in FIG. 15 the cell window $23_1$ is opened. The voltage waveform $D_1$ of the individual cell drive signal, that is, a pixel signal, is 180° out of phase with the high-frequency voltage waveform $V(H)$ superimposed on the voltage waveform $C_a$ which is provided to the common drive line $21a$. Consequently, a composite waveform of the voltage waveforms $C_a$ and $D_1$ which are applied to the liquid crystal of the cell window $23_1$ near the common drive line $21a$ takes a voltage waveform in which the high-frequency component is emphasized as shown in $C_a\text{-}D_1$, and the cell window $23_1$ is fully opened. The composite waveform $C_a\text{-}D_1$ is free from polarity deviation. The period $I_2$ in FIG. 15 is a period in which to close the cell window $23_1$ in the diaphragm mode, and the pixel signal voltage waveform $D_1$ is in phase with the high-frequency voltage waveform $V(H)$ superimposed on the voltage waveform $C_a$. Consequently, the composite waveform $C_a\text{-}D_1$ which is applied to the liquid crystal becomes a low-frequency voltage waveform of no polarity deviation, fully closing the cell window $23_1$.

The next period $I_3$ is a period in which to place the cell window $23_1$ in the medium-diaphragmed state by the diaphragm mode of operation. The pixel signal voltage waveform $D_1$ is composed of the high-frequency voltage waveform $V(H)$ provided in the middle of the period $I_3$ and two high-frequency voltage waveforms $\overline{V}(H)$ 180° out of phase with the waveform $V(H)$ and provided before and after it. A composite waveform of such a pixel signal voltage waveform $D_1$ and the voltage waveform $C_a$ a period in which high-frequency components are emphasized and a period in which low-frequency components are emphasized, as indicated by $C_a\text{-}D_1$, and the duty ratio between them is in agreement with the duty ratio between the voltage waveforms $V(H)$ and $\overline{V}(H)$ of the voltage waveform $D_1$. By the composite voltage waveform $C_a\text{-}D_1$ and a composite voltage waveform $C_b\text{-}D_1$ (not shown) a low-frequency voltage gradient is formed in the liquid crystal of the cell window $23_1$ from the common drive line $21a$ toward $21b$, providing in the plane of the cell window $23_1$ a region where the effective voltage of the superimposed high-frequency voltage is predominant and a region where the effective voltage of the low-frequency voltage is predominant. The former is a light transmitting region and the later a light intercepting region. The area ratio between these regions is dependent on the above-mentioned duty ratio.

According to the low-frequency voltage gradient drive method described above, the composite voltage waveform which is provided to the liquid crystal is not one-sided in polarity as shown by the waveform $C_a\text{-}D_1$ although the cell window is driven by the unipolar pixel signal.

[Drive Method-6]

As described above in conjunction with the liquid crystal cell array drive methods 1 to 5, in either of the high-frequency voltage gradient drive method and the low-frequency voltage gradient drive method the liquid crystal assumes the homeotropic or homogeneous alignment depending on the high-low relation between the effective voltages of the high- and low-frequency voltages which are provided to the liquid crystal.

It has been found, however, that when the cell window is driven to permit the passage therethrough of light over the entire area thereof by use of the drive waveforms of the high-frequency voltage gradient drive method or the low-frequency voltage gradient drive method shown in FIG. 9 or 10, the light transmitting state is obtained at high speed in the region where the difference between the high- and low-frequency voltages is large and at low speed in the region where the difference is small, and consequently, exposure of a light-sensitive member is larger in the quantity of light in the former than in the latter, failing to achieve uniform exposure over the entire area of the cell window. On this account, in the case of employing the drive waveforms shown in FIG. 9, a bright image is formed in the region of the cell window near the electrode $21a$ where the voltage waveform $C_a$ is applied and a somewhat dark image is formed in the region near the electrode $21b$ where the voltage waveform $C_b$ is applied. In the case of using the drive waveforms depicted in FIG. 10, an image formed in the region where the voltage $C_a$ is applied is darker than in the region where the voltage $C_b$ is applied. In the case of recording a white-black image such as a character or the like, the above-mentioned nonuniform exposure over the entire area of the cell window poses problems of thinning of the character and fogging of the white background, leading to the formation of an image of poor quality.

Next, a description will be given of drive method which provides uniform exposure over the entire area of the cell window in the case of fully opening the window.

Figure 16A:
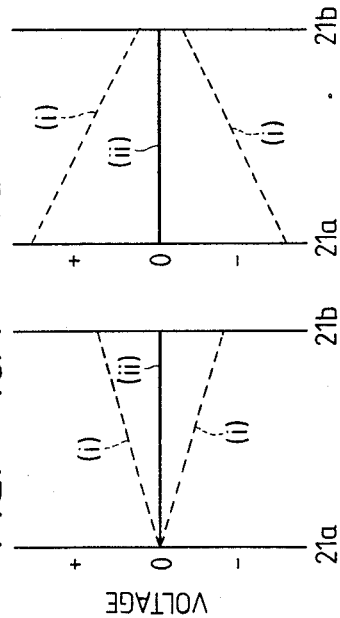
FIGS. 16A and 16B are voltage distribution diagrams, for explaining the principle of operation of another embodiment of the drive method of the present invention.
Figure 16B:
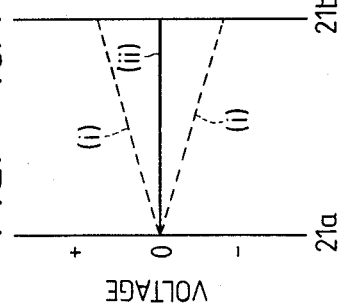
Figure 17A:
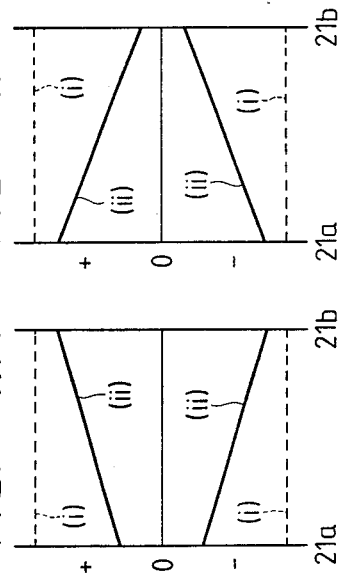
FIGS. 17A and 17B are voltage distribution diagrams, for explaining the principle of operation of another embodiment of the drive method of the present invention.
Figure 17B:
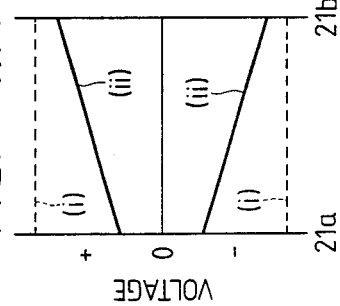

FIGS. 16A, 16B and 17A, 17B are diagrams, similar to FIG. 7, showing voltage distributions in the diaphragm mode period I in the case of the high- and low-frequency voltage gradient methods, respectively. FIG. 16B shows the voltage distribution for transmitting light through the cell window over the entire area thereof in the case of the high-frequency voltage gradient drive method. By virtue of the high-frequency voltage gradients indicated by the broken lines (i) and the low-frequency voltage (ii) set to the ground potential, the region near the common drive line $21a$ is fast in rising up to the light transmitting state but the region near the common drive line $21b$ is slow. To compensate this response distribution, drive waveforms are used which develop first a voltage distribution for compensation, shown in FIG. 16A, and then forms the voltage distribution depicted in FIG. 16B. According to this method, in the state shown in FIG. 16A the applied voltage in the region near the drive line $21b$ is higher than the applied voltage in the region near the drive line $21a$, and consequently, switching from the light intercepting state in the period S to the light transmitting state becomes faster toward the common drive line $21b$; Then, when the voltage distribution of FIG. 16B is developed after the above voltage distribution, the region near the common drive line $21a$ rises up quickly, for the applied voltage thereto is higher than that of the region near the common drive line $21b$. However, the region near the drive line $21b$ has already risen up by virtue of the compensating voltage distribution of FIG. 16A, and by adjusting the voltages to be applied and the time of their application for providing the voltage distributions of FIGS. 16A and 16B, the amounts of exposure of a light-sensitive member in the regions on the both sides $21a$ and $21b$ become substantially equal, forming uniformly exposed picture elements FIG. 17B shows the voltage distribution for transmitting light through the cell window over the entire area thereof by the low-frequency voltage gradient method. By virtue of the low-frequency voltage gradient indicated by the solid line (ii) and the high-frequency voltage indicated by the broken line (i), the region near the common drive line 21b is fast in rising up to the light transmitting state but the region near the common drive line 21a is slow. To compensate such a response distribution, drive waveforms are used which form first a compensating voltage distribution shown in FIG. 17A and then the voltage distribution depicted in FIG. 17B, as in the case of FIG. 16. With this method, in the compensating voltage distribution shown in FIG. 17A, since the difference between the high- and low-frequency voltages is greater on the side 21a than on the side 21b, switching from the light intercepting state in the all cell close mode period S to the light transmitting state in the diaphragm mode period I becomes faster toward the side 21a. Then, producing the voltage distribution of FIG. 17B, the region near the drive line 21b rises up quickly, for the voltage difference is smaller in this region than in the region near the drive line 21a. However, the region near the side 21a has already risen up by virtue of the voltage distribution of FIG. 17A as is the case with FIG. 16. By controlling the voltage distributions of FIGS. 17A and 17B and the voltage application durations, the quantities of light exposure to a photographic material in the region on the both sides 21a and 21b become substantially equal, forming a uniformly exposed picture element.

Some examples of drive methods which combine these driving conditions and the diaphragming operations explained previously will be described using the liquid crystal cell array schematically shown in FIG. 8 and various drive voltage waveforms shown in FIGS. 18 to 21.

Figure 18:
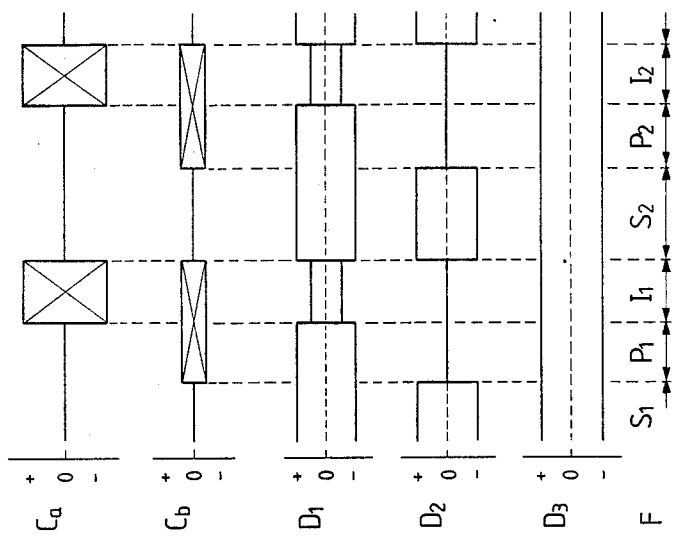
FIG. 18 is a waveform diagram, for explaining still another embodiment of the drive method of the present invention.

FIG. 18 shows various drive voltage waveforms for use in the application of the aforementioned response compensating method to the high-frequency voltage gradient drive method. In FIG. 18, $C_a$ and $C_b$ show common gradient forming voltage waveforms which are fed to the common drive lines 21a and 21b, respectively, $D_1$, $D_2$ and $D_3$ examples of pixel signal waveforms which are fed to the individual cell drive lines $20_1$, $20_2$ and $20_3$, respectively, and F a sequence of modes of operation. In FIG. 18, low-frequency voltages are each indicated by a broken line showing the base voltage of 0 V in each rectangular block, and high-frequency voltages are each marked with a cross in each block.

In the close mode period $S_1$ in which the cell windows $23_1$, $23_2$ and $23_3$ are all closed, the low-frequency voltages $D_1$, $D_2$ and $D_3$ are applied in the same phase, whereas the voltages of the waveforms $C_a$ and $C_b$ are held zero. The next period $P_1$ is a response distribution compensating period in which a compensating voltage distribution corresponding to FIG. 16A is formed for uniformly transmitting light through the cell window over the entire area thereof. In this example, the voltage waveform $C_a$ is zero volt and a high-frequency voltage is applied as the voltage waveform $C_b$. At this time, the waveform $D_2$ is a signal for making the entire area of the cell window light-transmitting and is zero volt. These voltage waveforms $C_a$, $C_b$ and $D_2$ are used to form the compensating voltage distribution shown in FIG. 16A. On the other hand, the voltage waveforms $D_1$ and $D_3$ are signals for placing the cell windows $23_1$ and $23_3$ in the medium-diaphragmed state and the closed state, respectively, and the same low-frequency voltages as in the period $S_1$ are applied. Under such conditions, the cell windows $23_1$ and $23_3$ remain in the light intercepting state (that is, the closed state) during the period $P_1$.

In the next period $I_1$, the voltage waveform $C_a$ becomes a high-frequency voltage higher than the voltage waveform $C_b$, forming the high-frequency voltage gradient shown in FIG. 16B. The voltage waveform $D_1$ forms, together with the voltage waveforms $C_a$ and $C_b$, such a voltage distribution as shown in FIG. 7, diaphragming the cell window $23_1$. The voltage waveform $D_3$ maintains the cell window $23_3$ in the light intercepting state. FIG. 16A corresponding to the period $P_1$ and FIG. 16B corresponding to the period $I_1$ differ from each other in the magnitude of high-frequency voltage applied to the common drive line 21b, but in FIG. 18 the signals $C_b$ in the periods $P_1$ and $I_1$ are shown to be of the same voltage for convenience of driving. It does not matter whether they are of the same voltage or not.

By the combined use of the sets of voltage waveforms described above, it is possible to place a desired cell window in the diaphragmed state, the light transmitting state with uniform exposure over the entire area of the window and the light intercepting state in the high-frequency voltage gradient drive method.

FIG. 19 shows, by way of example, simplification of the pixel signal voltage waveforms $D_1$, $D_2$ and $D_3$ by applying low-frequency voltages as the signals $C_a$ and $C_b$ instead of using the low-frequency voltage waveforms $D_1$, $D_2$ and $D_3$ in the periods $S_1$, $S_2$, ... in FIG. 18. Also in this case, the composite voltage waveform which is applied to the liquid crystal becomes exactly the same as in FIG. 18, though not shown.

FIG. 20 shows, by way of example, drive waveforms which include the response distribution compensating period in the case of the low-frequency voltage gradient drive method described above in respect of FIGS. 17A and 17B. In the period $S_1$ in which the cell windows $23_1$, $23_2$ and $23_3$ (see FIG. 8) are all held in the closed state, low-frequency voltage waveforms $C_a$ and $C_b$ are provided to the common drive lines 21a and 21b in the same phase. The voltage waveforms $D_1$, $D_2$ and $D_3$ are held at zero volt.

In the next period $P_1$ a voltage distribution corresponding to FIG. 17A is provided for making, for example, the cell window $23_2$ transmit light uniformly over the entire area thereof. In this instance, the voltage waveform $C_a$ is a low-frequency voltage lower than the voltage waveform $C_b$ which is a low-frequency voltage lower than in the period $S_1$. The voltage waveform $D_2$ in the period $P_1$ is a compensating signal for making the cell window $23_2$ transmit light uniformly over the entire area thereof in the next period $I_1$, and this signal is a high-frequency voltage. The voltage waveforms $D_1$ and $D_3$ in the period $P_1$ are signals for placing the cell windows $23_1$ and $23_3$ in the light intercepting state, respectively, and they are zero volt as in the period $S_1$. In the next low-frequency voltage higher than the voltage waveform $C_b$, forming the low-frequency voltage gradient in FIG. 17B. Further, the high-frequency voltage waveform $D_1$ is a signal for placing the cell window $23_1$ in the medium-diaphragmed state and the voltage waveform $D_3$ is a signal for maintaining the cell window $23_3$ in the closed state.

Figure 21:
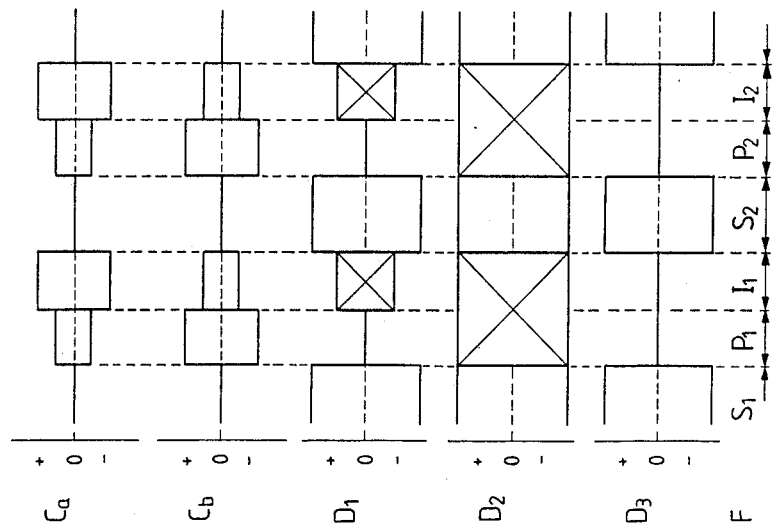
FIG. 21 is a waveform diagram, for explaining a modification of the drive method described in respect of FIG. 20.

By combining the drive voltage waveforms described above, it is possible to place a desired cell window in the light transmitting state with uniform exposure, the diaphragmed state and the light intercepting state also in the low-frequency voltage gradient method. FIG. 21 shows the case where the low-frequency voltage provided as the signals $C_a$ and $C_b$ in the periods $S_1$, $S_2$, ... in FIG. 20 are applied as the signals $D_1$, $D_2$ and $D_3$. In this instance, the composite voltage waveform which is applied across the liquid crystal is the same as in FIG. 20 and produces the same effect as mentioned above.

[Drive Method-7]

In the examples described above in connection with FIGS. 16A to 21, the aperture ratio is controlled by controlling the wave height of the voltage waveform. It is also possible to vary the aperture ratio by changing the high-frequency pulse width (i.e. the duty ratio) while holding the voltage constant. The method of changing the aperture ratio by controlling the duration of effective voltage application permits easy control by a digital circuit in combination with the use of a fixed voltage. This method is therefore advantageous in that the drive circuit structure used is simpler than is required in the method of changing the aperture ratio by voltage control.

Moreover, the examples of FIGS. 16A to 21 have been described to control the diaphragming operation by the bipolar signal, but a unipolar signal can be employed, in which case the drive circuit used is further simplified.

The drive method which involves the compensation of the response distribution (the periods $P_1, P_2, \ldots$) shown in FIG. 19 can also be so modified as to use unipolar signals $D_1, D_2, \ldots$ and compensate the polarity deviation. Next, a description will be given of this modified method.

Figure 22:
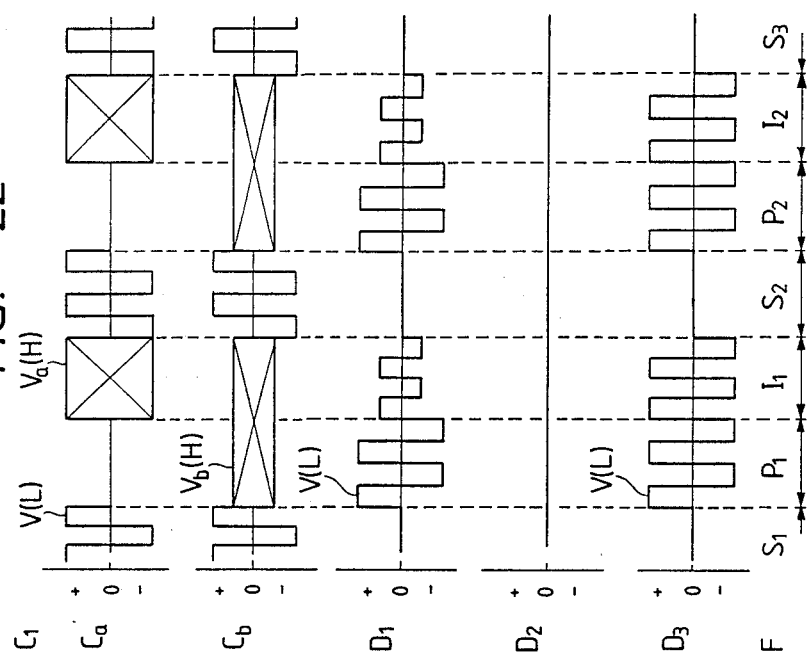
FIG. 22 is a waveform diagram having rewritten low-frequency voltage waveforms depicted in FIG. 19.
Figure 23:
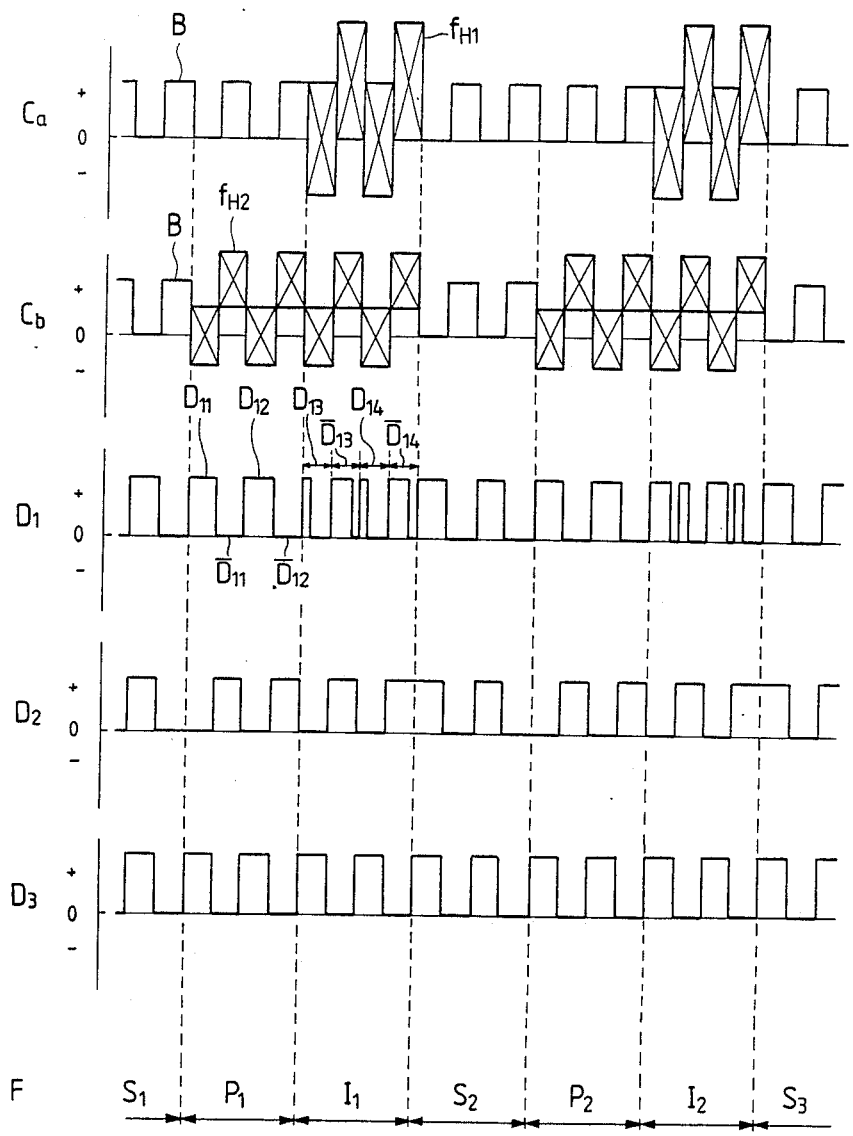
FIG. 23 is a diagram showing waveforms which occur in the case of a combined use of the drive methods described in connection with FIGS. 22 and 13.

FIG. 22 shows mere revised versions of the drive waveforms of FIG. 19 for better understanding of the low-frequency voltage waveforms. To reduce the scale of the drive circuitry used, the pixel signal waveforms $D_1, D_2, \ldots$ in FIG. 22 are changed to unipolar signal waveforms of a fixed wave height as shown in FIG. 23, and the common drive voltage waveforms $C_a$ and $C_b$ in FIG. 22 are also changed in the same manner as in the case of FIG. 13 to compensate for the polarity deviation which would result from the employment of the unipolar signal waveforms. FIG. 23 shows these drive voltage waveforms. The voltage waveforms $C_a$ and $C_b$ in the periods $P_1$ and $I_1$ in FIG. 23 are equivalent to those which are obtained by extracting and polarity-inverting the negative portion of the low-frequency voltage waveform $D_3$ used in FIG. 22 for closing a cell window and biasing the voltage waveforms $C_a$ and $C_b$ in FIG. 22 with the polarity-inverted waveform portion. This applies to the periods $P_2$ and $I_2$. On the other hand, the voltage waveforms $C_a$ and $C_b$ in the periods $S_1$ in FIG. 23 are obtained by removing the negative waveform portions of the waveforms $C_a$ and $C_b$ in the corresponding period in FIG. 22. The removed negative waveforms are inverted in polarity and combined with the voltage waveforms $D_1, D_2, \ldots$ in the same period, providing the voltage waveforms $D_1, D_2, \ldots$ in the period $S_1$ in FIG. 23.

The periods $S_1, S_2, \ldots$ are close mode periods in which to close all the cell windows $23_1, 23_2$ and $23_3$ The unipolar low-frequency voltages $C_a$ and $C_b$ which are identical with each other are fed to the common drive lines $21a$ and $21b$, and low-frequency voltages which are 180° out of phase with the voltages $C_a$ and $C_b$ but of the same polarity are fed to the individual cell drive lines $20_1, 20_2$ and $20_3$.

The periods $I_1, I_2, \ldots$ are diaphragm mode periods, in which high-frequency voltages biased by such a low-frequency voltage as explained above are fed as the common drive signals $C_a$ and $C_b$ to the common drive lines $21a$ and $21b$, forming a high-frequency voltage gradient which gradually decreases from the common drive line $21a$ toward the drive line $21b$. On the other hand, the unipolar low-frequency individual cell drive signals $D_1, D_2, \ldots$ each have, in the first half of each cycle, a waveform of a duty ratio corresponding to a pixel signal and, in the second half of each cycle, a waveform obtained by reversing the duty ratio in the first half cycle. As a result, the effective voltage of the low-frequency component superimposed on the high-frequency component of the composite voltage waveform that is provided to the liquid crystal varies with pixel signals. In the period $I_1$ in FIG. 23, the cell window $23_2$ which is supplied with the waveform $D_2$ is fully opened because the low-frequency component of the effective voltage applied to the liquid crystal is zero, and the cell window $23_3$ which is supplied with the waveform $D_3$ is fully closed because the low-frequency component of the effective voltage applied to the liquid crystal is equal to or larger than the high-frequency component (the high-frequencies $f_{H1}$ and $f_{H2}$ and the low-frequency voltage $f_L$ being selected accordingly). In the cell window $23_1$ which is supplied with the waveform $D_1$ the low-frequency component of the effective voltage applied to the liquid crystal becomes intermediate between the low-frequency components in the cases of the waveforms $D_2$ and $D_3$, and consequently, the cell window $23_1$ is placed in the medium-diaphragmed state.

In the compensation mode periods $P_1, P_2, \ldots$ the high-frequency voltage superimposed on the low-frequency voltage is fed to the common drive line $21b$ alone, forming a high-frequency voltage gradient which gradually decreases from the common drive line $21b$ toward the drive line $21a$. This high-frequency voltage gradient compensates the response distributions in the cell windows $23_1$ and $23_2$ in the diaphragm mode periods $I_1, I_2, \ldots$ With the use of the drive waveforms shown in FIG. 23, the response distribution in each cell window can be compensated, and further, composite voltages which are provided to the liquid crystal in each cell window, for example, such composite voltages as $C_a$-$D_1$ and $C_b$-$D_1$, are free from the polarity deviation in all of the periods S, P and I. In addition, the voltage waveform D of each individual cell drive signal is unipolar, and hence can be generated by simple-structured digital circuits.

[Other Drive Methods]

Figure 1:
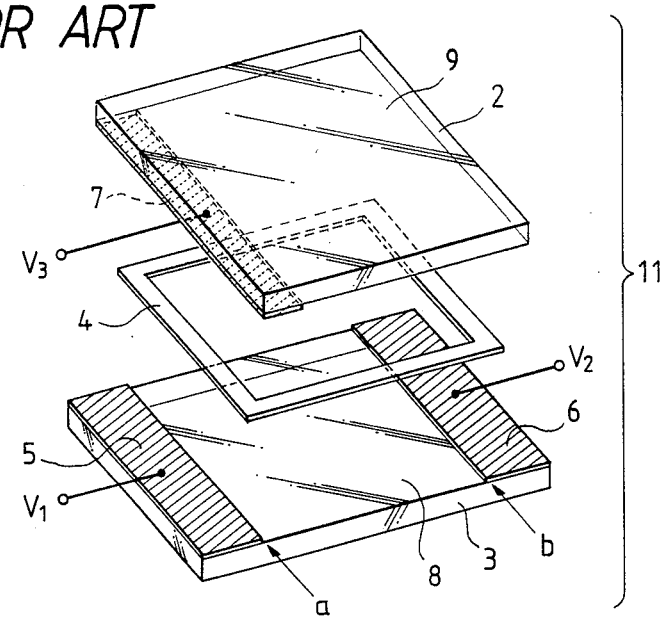
FIG. 1 is an exploded perspective view of a conventional gradient voltage driving type liquid crystal cell.

The foregoing has described some examples of the two-frequency drive method for driving the liquid crystal cell array of the present invention. As noted previously, ferroelectric liquid crystal can be used for the liquid crystal cell array of the present invention. Also in the case of employing the ferroelectric liquid crystal, each cell of the cell array operates on the same principle as described previously with respect to FIGS. 2A to 2D. The driving of the liquid crystal cell array of the present invention such as schematically shown in FIG. 8, for instance, is far easier than in the case of independently driving each of a plurality of conventional liquid crystal cells (shown in FIG. 1) merely assembled together. In addition, there is no need of providing at least two voltage generators of different frequencies in each drive circuit which is employed for the drive methods 1 to 7.

Figure 24:
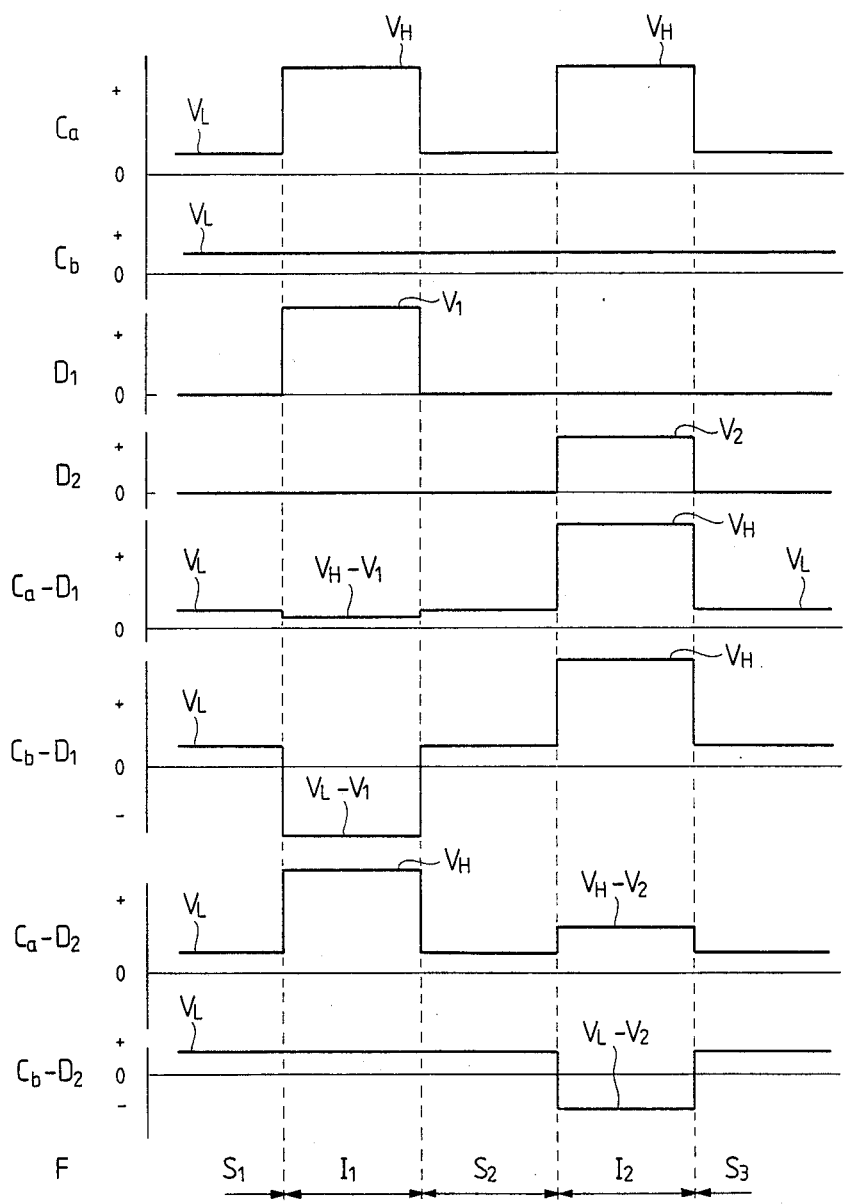
FIG. 24 is a waveform diagram, for explaining another drive method of the present invention.

FIG. 24 is a waveform diagram, for explaining a drive method for use in the case of employing the ferroelectric liquid crystal in the liquid crystal cell array of the present invention schematically depicted in FIG. 8. In FIG. 24 there are shown drive waveforms for only the cell windows $23_1$ and $23_2$. In the period $S_1$ in which all the cell windows are closed, the same low voltage $V_L$ is fed to both of the first and second common drive lines $C_a$ and $C_b$, and consequently, no voltage gradient is formed in the cell windows $23_1$, $23_2$ and $23_3$. At this time, the individual cell drive lines $20_1$, $20_2$ and $20_3$ are not supplied with voltage and are held at zero volt. As a result, the voltage which is applied to liquid crystal of the cell windows $23_1$, $23_2$ and $23_3$ is only the same voltage $V_L$ which is uniform over the entire area of each cell window, as indicated by composite voltage waveforms $C_a$-$D_1$, $C_b$-$D_1$, $C_a$-$D_2$, $C_b$-$D_2$. The polarizing directions of the two polarizing plates, disposed on the opposite sides of the liquid cell array have been preset so that light passing through the cell windows $23_1$, $23_2$ and $23_3$ is intercepted in this state.

In the period $I_1$ in which the individual cell windows are diaphragmed as desired, the cell window $23_1$ is placed in the medium-diaphragmed state and the cell window $23_2$ in the closed state in this example. To perform this, a positive voltage $V_1$ which is lower than a voltage $V_H$ and corresponds to a pixel signal and zero volt are applied to the individual cell drive lines $20_1$ and $20_2$, respectively. In consequence, the composite voltage which is applied across the liquid crystal of the cell window $23_1$ gradually varies from a relatively small positive value to a relatively large negative value in the direction from the drive line $21a$ toward the drive line $21b$, as shown by composite voltage waveforms $C_a$-$D_1$ and $C_b$-$D_1$. The region supplied with the positive voltage intercepts light and the region supplied with the negative voltage transmits light therethrough. On the other hand, the composite voltage which is applied across the liquid crystal of the cell window $23_2$ gradually varies from a relatively large positive value to a relatively small positive value in the direction from the drive line $21a$ toward the drive line $21b$, as shown by composite voltage waveforms $C_a$-$D_2$ and $C_b$-$D_2$, and the cell window $23_2$ is closed since the applied voltage thereto is positive over the entire area thereof.

In the diaphragm mode period $I_2$ the cell window $23_1$ is placed in the closed state and the cell window $23_2$ in the medium-diaphragmed state in a similar manner. If the voltage $V_1$ which is fed to the individual drive line $20_1$ in the period $I_1$ is selected equal to or higher than the voltage $V_H$, then the composite voltage $C_a$-$D_1$ will become zero or negative, fully opening the cell window $23_2$. Where the liquid crystal used has a property of monostable molecular alignment, even if the aforementioned low voltage $V_L$ in FIG. 24 is set to zero, the same operation as mentioned above can be performed by arranging the two polarizing plates in a manner to intercept light in the stable alignment state of the liquid crystal.

[Specific Operative Example of Drive Circuit]

The foregoing description has been given of various drive methods suitable for the liquid crystal cell array of the present invention. Next, a description will be given of a specific operative example of the drive circuit for implementing the drive method-7 described previously with regard to FIG. 23, which is one of the most practical drive methods.

Figure 25:
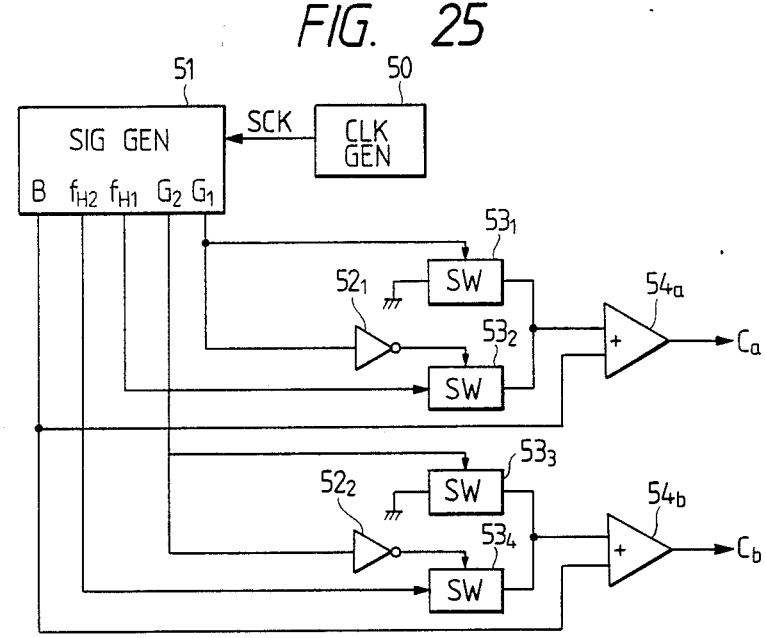
FIG. 25 is a block diagram illustrating a signal generator for generating waveforms $C_a$ and $C_b$ depicted in FIG. 23.
Figure 26:
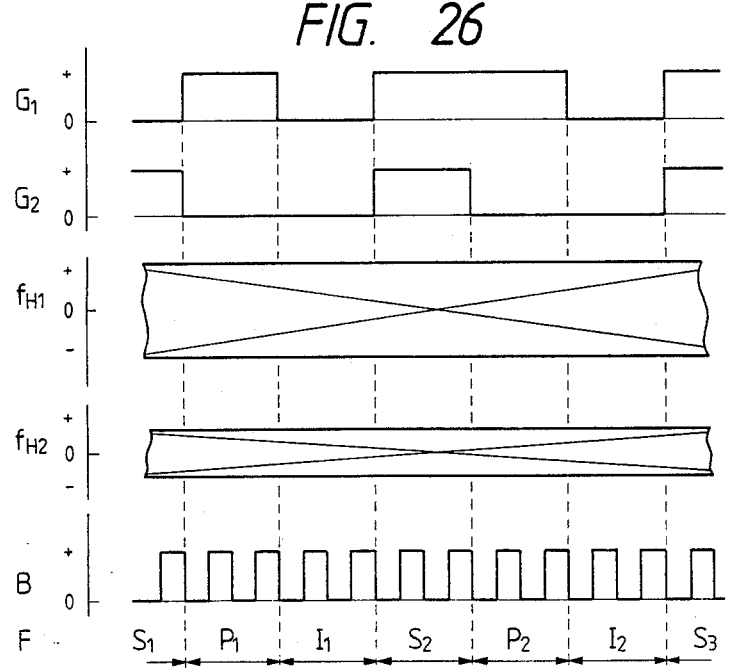
FIG. 26 is a timing chart showing various signal waveforms occurring in the signal generator depicted in FIG. 25.

FIG. 25 is a block diagram of a common drive signal generating apparatus for generating the voltage waveforms $C_a$ and $C_b$ shown in FIG. 23. The apparatus comprises a clock generator 50, a signal generator 51, inverters $52_1$ and $52_2$, analog switches $53_1$ to $53_4$ and adders $54_a$ and $54_b$. The analog switches $53_2$ and $53_4$ are ON-OFF controlled by gate signals $G_1$ and $G_2$ from the signal generator 51 so that they pass therethrough AC signals $f_{H1}$ and $f_{H2}$ from the signal generator 51 to the adders $54_a$ and $54_b$, respectively. The signal generator 51 generates, in synchronism with a system clock SCK from the clock generator 50, two bipolar high-frequency signals $f_{H1}$ and $f_{H2}$ of different amplitudes, a unipolar low-frequency signal B and the two gate signals $G_1$ and $G_2$ as shown in FIG. 26. The adder $54_a$ performs an in-phase addition of a zero potential fed via the switch $53_1$ or the high-frequency signal $f_{H1}$ via the switch $53_2$ and the signal B and provides the added output as a common drive signal $C_a$. The adder $54_b$ similarly performs an in-phase addition of a zero potential fed thereto via the switch $53_3$ or the high-frequency signal $f_{H2}$ via the switch $53_4$ and the signal B and provides the added output as a common drive signal $C_b$. In this way, the voltage waveforms $C_a$ and $C_b$ in FIG. 23 are produced.

Figure 27:
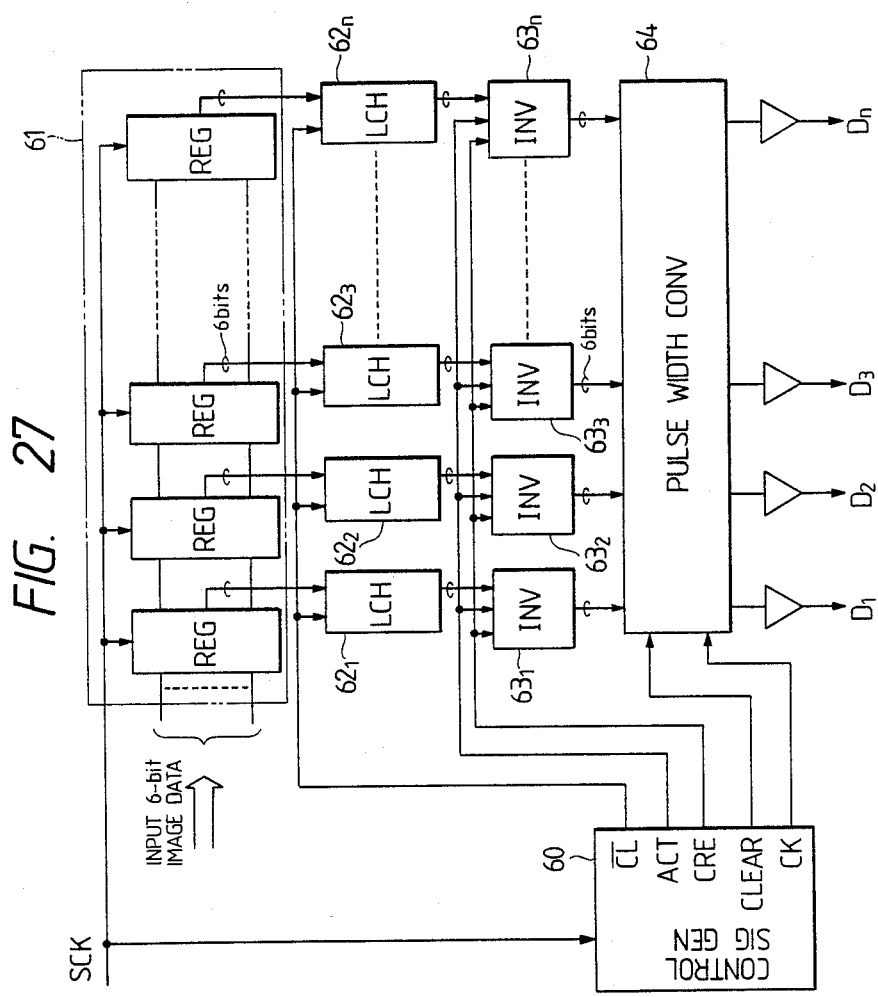
FIG. 27 is a circuit diagram illustrating a signal converter for generating waveforms $D_1, D_2, \ldots$ in FIG. 23.
Figure 28:
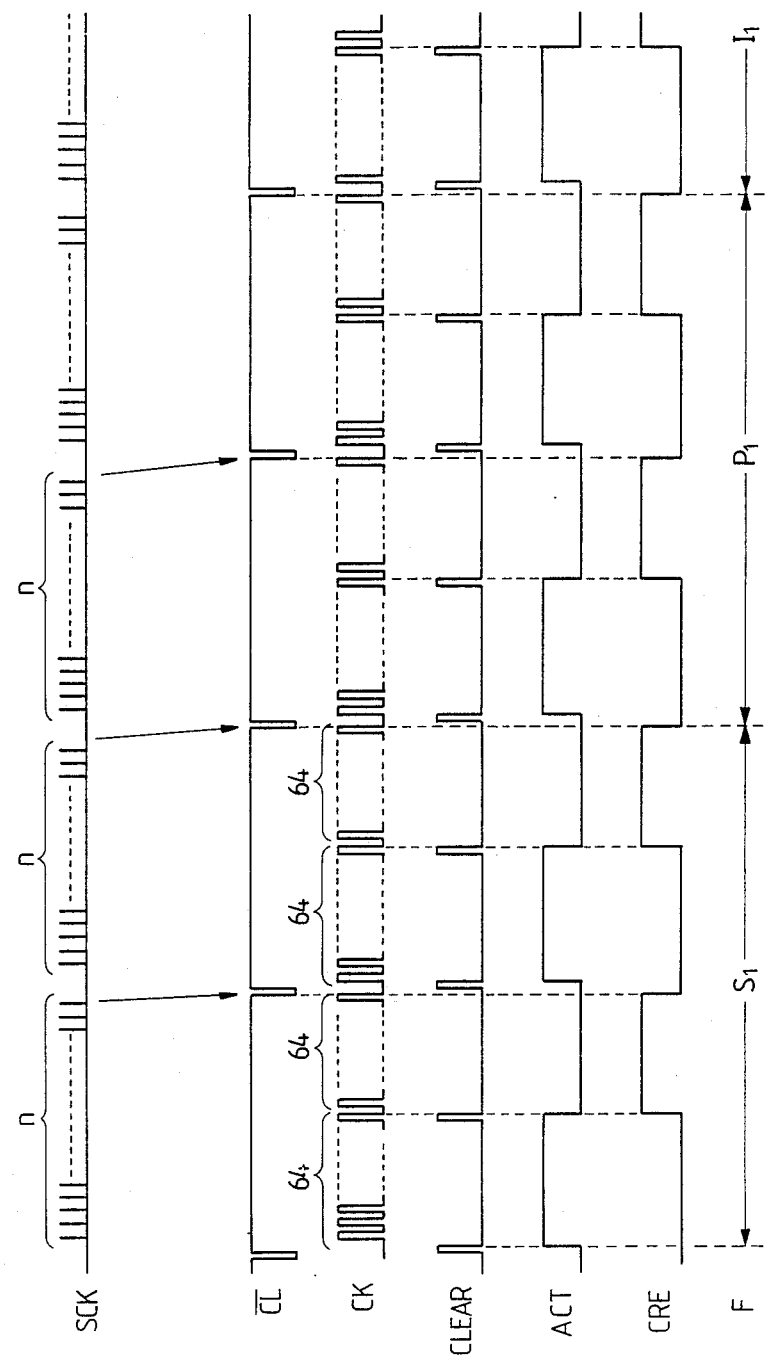
FIG. 28 is a timing chart, for explaining the operation of the circuit shown in FIG. 27.

FIG. 27 illustrates a signal converter for converting input image data to pixel signals $D_1$, $D_2$, ... which are individual cell drive voltage waveforms shown in FIG. 23. A control signal generator 60 generates, in synchronism with the system clock SCK from the clock generator 50 in FIG. 25, such control signals $\overline{CL}$, CK, CLEAR, ACT and CRE as shown in FIG. 28. Successive n image data for one line each of, for example, parallel 6 bits are sequentially input into n stages of parallel 6-bit shift registers 61. The n image data thus loaded in the shift registers 61 are simultaneously latched by the latch signal $\overline{CL}$ into n 6-bit latches $62_1$ to $62_n$, and at the same time, n image data of the next line are sequentially input into the shift registers 61. The n image data latched in the latches $62_1$ to $62_n$ are respectively provided to inverters $63_1$ to $63_n$, from which they are output in inverted or uninverted form according to the logical levels of the control signals ACT and CRE such as depicted in FIG. 28. For example, when the control signal ACT is H-level and the control signal CRE is L-level, the image data is not inverted and the inverters $63_1$ to $63_n$ output the input 6-bit data in uninverted form. When the control signal ACT is L-level and the signal CRE is H-level, the image data is inverted and each inverter outputs the 6-bit image data with the logic of each bit inverted. The 6-bit signals from the inverters $63_1$ to $63_n$ are applied to a pulse width converter 64, outputting therefrom pulses of widths determined by the 6-bit signals. The pulse width converter 64 counts pulses of the signal CK input thereto by the numbers equal to the values of the 6-bit data input from the inverters $63_1$ to $63_n$, respectively, and generates pulses of durations equal to the respective count values in one cycle specified by the signal CLEAR. The signal CLEAR is produced, for instance, every $2^6$ (i.e. 64) CK pulses and its period is preset to $\frac{1}{2}$ the period with which the image data are latched in the latches $62_1$ to $62_n$. As indicated by the signals ACT and CRE in FIG. 28, the inverters $63_1$ to $63_n$ each repeat the non-inversion and inversion every 64 pulses CK. For example, as indicated by the waveform $D_1$ in FIG. 23, pulses $D_{11}$, $\overline{D}_1$, $D_{12}$, $\overline{D}_{12}$, $D_{13}$, $\overline{D}_{13}$, $D_{14}$, $\overline{D}_{14}$ are sequentially derived, by the pulse width converter 64, from 6-bit image data $D_{11}$, $D_{12}$, $D_{13}$ and $D_{14}$ which are applied to the latch $62_1$ one after another. Thus, the voltage waveform $D_1$ is produced. In the compensation mode period $P_1$ the image data $D_{11}$ and $D_{12}$ are both "111111", and in the diaphragm mode period $I_1$ the image data $D_{13}$ and $D_{14}$ can take any arbitrary values.

Next, experimental examples will be described.

[Experimental Example 1]

The liquid crystal cell array of the structure shown in FIGS. 3A and 3B was produced as follows: The first transparent electrodes $9_1, 9_2, 9_3, \ldots$ forming cell windows were each formed by an indium oxide film having a sheet resistance of 50 $\Omega$/sq, the second transparent electrodes $10_1, 10_2, 10_3, \ldots$ disposed opposite the first transparent electrodes were each formed by a tin oxide film having a sheet resistance 100 K$\Omega$/sq, and the drive lines $20_1, 20_2, \ldots$ and $21a$ and $21b$ were formed by vapor deposition of aluminum. Each cell window was made in a size of 250 $\mu m^2$. The spacer 4 made of polyester and 6 $\mu m$ thick was sandwiched between the first and second transparent substrates 2 and 3, and the gap defined by the spacer 4 between the first and second transparent substrates was filled with liquid crystal 16 for two-frequency drive. The polarizing plates were mounted on the top of the first transparent substrate 2 and the underside of the second transparent substrate 3, respectively, so that their directions of polarization would intersect each other in the low-frequency drive. The drive lines $20_1, 20_2, \ldots$ and $21a$ and $21b$ were connected to independent drive circuits.

The waveforms shown in FIG. 9 were used as drive waveforms, and the respective waveforms $D_1, D_2, \ldots$ for application to the individual cell drive lines $20_1, 20_2,$ were controlled in accordance with pixel signals. The frequencies of the waveforms $C_a, C_b$ and $D_1, D_2, \ldots$ in FIG. 9 were selected as follows:

The frequencies of the low- and high-frequency voltages for the waveforms $C_a$ and $C_b$ were 2 and 100 KHz, respectively, and the wave height of the low-frequency voltage was $\pm 25$ V and the wave height of the high-frequency voltage was $\pm 25$ V for $C_a$ and $\pm 5$ V for $C_b$. The frequency of the low-frequency voltage for the waveforms $D_1, D_2$ and $D_3$ in FIG. 9 was 4 KHz and its wave height was 0 to $\pm 25$ V. The cell windows $23_1, 23_2, \ldots$ were controlled under such frequency conditions. As a result, the cell windows were diaphragmed with desired aperture ratios and their operation characteristics did not markedly change even by repeating the operation $10^7$ times.

[Experimental Example 2]

The same cell array as used in Example 1 was employed.

The waveforms shown in FIG. 10 were used for driving the cell array. The voltage waveforms $D_1, D_2, \ldots$ were controlled in accordance with pixel signals. The frequencies of the voltage waveforms $C_a, C_b$ and $D_1, D_2, \ldots$ used were selected as follows:

The frequency of the low-frequency voltage for the waveforms $C_a$ and $C_b$ was 2 KHz and its wave height was +25 V. The wave height of the low-frequency voltage in the diaphragm mode periods $I_1$ and $I_2$ was +25 V for $C_a$ and +5 V for $C_b$. The frequency of the high-frequency voltage for the waveforms $D_1, D_2, \ldots$ was 100 KHz and its wave height was 0 to $\pm 25$ V. The cell windows $23_1, 23_2, \ldots$ were controlled under such frequency conditions. As a result, the cell windows were diaphragmed with desired aperture ratios and their operation characteristics did not markedly change even after repeating the operation $10^7$ times.

[Experimental Example 3]

The same cell array as in Experimental Example 1 was used.

The waveforms shown in FIG. 11 were used for driving the cell array. The voltage waveforms $D_1, D_2, \ldots$ were controlled in accordance with pixel signals. The frequencies of the voltage waveforms $C_a$ and $C_b$ were the same as those in Experimental Example 1.

The high-frequency voltages of the waveforms $D_1, D_2, \ldots$ for individually controlling the cell windows $23_1, 23_2, \ldots$ were unipolar voltages and their wave heights ranged from 0 to 25 V.

As a result, the cell windows were damaged with desired aperture ratios, but when the cycle period of operation was in excess of about 200 times per second, the area of the light transmitting region 41 of each cell window during the diaphragming operation varied and its high-speed operation was unstable.

[Experimental Example 4]

The same cell array as in Experimental Example was used.

The waveforms shown in FIG. 12 were used for driving the cell array and their concrete frequencies and voltages were the same as those in Experimental Example 3, but in this example, waveforms for compensating for polarity deviation in the period J were additionally employed.

As a result, each cell window was diaphragmed with a desired aperture ratio, and even when the cycle period of operation was 400 times per second, the cell window operated stably with substantially no variation in the area of its light transmitting region during diaphragming.

Furthermore, the operation characteristics of the cell windows did not markedly change even after repeating the operation $10^7$ times.

[Experimental Example 5]

The liquid crystal cell array of the structure shown in FIGS. 3A and 3B was produced as follows: The first transparent electrodes $9_1, 9_2, \ldots$ were each formed by an indium oxide film having a sheet resistance of 50 $\Omega$/sq, the second transparent electrodes $10_1, 10_2, \ldots$ were each formed by a tin oxide film having a sheet resistance of 100 K$\Omega$/sq, and the drive lines $20_1, 20_2, \ldots$ and $21a$ and $21b$ were formed of nickel by electroless plating. Each cell window was 250 $\mu m^2$. Glass beads were interposed as a spacer between the first and second transparent substrates 2 and 3 to define therebetween a gap, which was filled with liquid crystal for twofrequency drive. The polarizing plates were mounted on the top of the first transparent substrate 2 and the underside of the second transparent substrate 3, respectively, with their directions of polarization crossed at right angles to each other. The drive lines $20_1, 20_2, \ldots$ and $21a$ and $21b$ were connected to independent drive circuits.

The waveforms shown in FIG. 13 were employed for driving the liquid crystal cell array. The waveforms $D_1, D_2, \ldots$ (only the waveform $D_1$ being shown in FIG. 3) to be applied to the individual cell drive lines $20_1, 20_2, \ldots$ were controlled in accordance with pixel signals corresponding thereto. The frequencies of the waveforms $C_a, C_b$ and $D_1, D_2, \ldots$ used were selected as follows:

The frequency of the low-frequency voltage used for $C_a$ and $C_b$ in the period $I_1$ was 1 KHz and a bipolar high-frequency voltage 100 KHz was superimposed on the low-frequency voltage. The wave height of the low-frequency voltage was set to +25 V and the wave height of the high-frequency voltage +20 V for $C_a$ and +5 V for $C_b$. As the low-frequency voltage signal for each of the waveforms $D_1, D_2, \ldots$ in FIG. 13, a +25 V pulse with a 0.5 ms width was used and its rise-up timing was controlled of each of the periods $I_1, I_2$ and $I_3$ of a 1 ms time slot. The cell windows $23_1, 23_2, \ldots$ were controlled under such conditions and could be diaphragmed with desired aperture ratios.

[Experimental Example 6]

The liquid crystal cell array used was the same as in Experimental Example 1.

The waveforms shown in FIG. 14 were used for driving the cell array. The waveforms $D_1, D_2, \ldots$ (only the waveform $D_1$ being shown in FIG. 14) to be applied to the individual cell drive lines $20_1, 20_2, \ldots$ were controlled in accordance with pixel signals corresponding thereto. The waveforms $C_a$, $C_b$ and $D_1, D_2, \ldots$ in FIG. were selected as follows:

The frequency of the low-frequency voltage for $C_a$ and $C_b$ was set to 1 KHz and a unipolar ±20 V high-frequency voltage of a frequency 100 KHz was superimposed on the low-frequency voltage. The wave height of the low-frequency voltage in the periods $I_1, I_2, \ldots$ was set to ±25 V for $C_a$ and ±5 V for $C_b$. A ±20 V, 100 KHz high-frequency voltage was used for $D_1, D_2, \ldots$ The cell windows $23_1, 23_2, \ldots$ were controlled by applying thereto the high-frequency voltage in phase or 180° out of phase with the low-frequency voltage signals $C_a$ and $C_b$ As a result, the cell windows $23_1, 23_2, \ldots$ could be diaphragmed with desired aperture ratios.

[Experimental Example 7]

The liquid crystal cell array used was the same as in Experimental Example 1.

The waveforms shown in FIG. 18 were employed for driving the liquid crystal cell array. The waveforms $D_1, D_2, \ldots$ to be applied to the individual cell drive lines $20_1, 20_2, \ldots$ were controlled in accordance with pixel signals corresponding thereto. The frequencies of the waveforms $C_a$, $C_b$ and $D_1, D_2, \ldots$ were selected as follows:

The frequency of the low-frequency voltage for the waveforms $C_a$ and $C_b$ was set to 1.3 KHz and the frequency of the high-frequency voltage therefor was set to 150 KHz. The wave height of the low-frequency voltage was set to ±30 V and the wave height of the high-frequency voltage was set to ±30 V for $C_a$ and ±15 V for $C_b$.

As a result, the cell windows $23_1, 23_2, \ldots$ could e diaphragmed with desired aperture ratios and placed in the light transmitting state with uniform exposure over the entire area of each cell.

[Experimental Example 8]

The liquid crystal cell array used was the same as in Experimental Example 1.

The waveforms shown in FIG. 20 were employed for driving the liquid crystal cell array. The waveforms $D_1, D_2, \ldots$ to be applied to the individual cell drive lines $20_1, 20_2, \ldots$ were controlled in accordance with pixel signals corresponding thereto. The frequencies of the waveforms $C_a$, $C_b$ and $D_1, D_2, \ldots$ were selected as follows:

The frequency of the low-frequency voltage for the waveforms $C_a$ and $C_b$ was set to 1.5 KHz, and its wave height was set to ±30 V in the periods $S_1, S_2, \ldots$, to ±15 V for $C_a$ and ±25 V for $C_b$ in the periods $P_1$ and $P_2$ and to ±25 V for $C_a$ and ±10 V for $C_b$ in the periods $I_1, I_2, \ldots$ The frequency of the high-frequency voltage for the waveforms $D_1, D_2, \ldots$ in FIG. 20 was set to 150 KHz and its wave height in the range of 0 to ±30 V.

As a result, the cell windows $23_1, 23_2, \ldots$ could be diaphragmed with desired aperture ratios and place in the light transmitting state with uniform exposure over the entire area of each cell.

[Experimental Example 9]

The same liquid crystal cell array as in Experimental Example 1 was used.

The waveforms shown in FIG. 23 were employed for driving the liquid crystal cell array. The voltage waveforms $D_1, D_2, \ldots$ to be applied to the individual cell drive lines $20_1, 20_2, \ldots$ were controlled in accordance with pixel signals corresponding thereto. The frequencies of the waveforms $C_a$, $C_b$ and $D_1, D_2, \ldots$ were selected as follows:

The low-frequency voltage for the waveforms $C_a$ and $C_b$ was 2 KHz in frequency and unipolar and its wave height was set to ±30 V. This low-frequency voltage is the low-frequency voltage B referred to previously in connection with FIGS. 25 and 26. The frequencies of the high-frequency voltages $f_{H1}$ and $f_{H2}$ were set to 150 KHz and the wave height of the former was set to ±25 V and the wave height of the latter ±10 V. The signals $C_a$ and $C_b$ were produced by the circuit depicted in FIG. 25. The low-frequency voltage for the waveforms $D_1, D_2, \ldots$ was 30 V in wave height and unipolar.

As a result, the cell windows $23_1, 23_2, \ldots$ could be diaphragmed with desired aperture ratios.

It will be apparent that many modifications and variations may be effected without departing from the scope of the novel concepts of the present invention.

What is claimed is:

1. A liquid crystal cell array comprising:
    a first transparent substrate;
    a second transparent substrate disposed in parallel and opposite to the first transport substrate;
    a plurality of first transparent electrodes arranged on the inner surface of the first transparent substrate;
    a plurality of individual cell drive lines formed on the inner surface of the first transparent substrate and each connected to one of the plurality of first transparent electrodes;
    at least one second transparent electrode formed on the inner surface of the second transparent substrate in an opposed relation to the first transparent electrodes;
    first and second common-side electrodes connected to both ends of the second transparent electrode;
    a first common drive line formed on the inner surface of the second transparent substrate and connected to the first common-side electrode of the second transparent electrode;
    a second drive line formed on the inner surface of the second transparent substrate and connected to the second common-side electrode of the second transparent electrode; and
    liquid crystal sealed between the first and second transparent substrates, said liquid crystal being of a type which reverses its dielectric anisotropy when a driving frequency therefor changes from a frequency above to a frequency below a critical frequency and vice versa;
    regions over which light is transmitted through the first transparent electrodes and the second transparent electrode defining a plurality of cell windows.

2. The liquid crystal cell array of claim 1, wherein the plurality of first transparent electrodes are aligned at regular intervals.

3. The liquid crystal cell array of claim 1, wherein the first and second common-side electrodes and the first and second common drive lines are made of metal, the first common-side electrode and the first common drive line connected to each other and the second common-side electrode and the second drive line connected to each other being formed as one body, respectively.

4. The liquid crystal cell array of claim 1, wherein the second transparent electrode has a plurality of square electrodes spaced apart one another and the first and second commonside electrodes are formed along two opposite sides of the square electrodes, respectively.

5. The liquid crystal cell array of claim 1, wherein the second transparent electrode is a single stripe-shaped transparent electrode and has a plurality of cell windows defined at regular intervals in its lengthwise direction.

6. The liquid crystal cell array of claim 1, wherein the second transparent electrode has a sheet resistance sufficiently higher than those of the first transparent electrodes.

7. The liquid crystal cell array of claim 6, wherein the sheet resistance of the second transparent electrode is in the range of $10^8$ to $10^5$ $\Omega$/sq.

8. A method for driving a liquid crystal cell array which includes a first transparent substrate which has formed thereon a plurality of first transparent electrodes and a plurality of individual cell drive lines connected to the first transparent electrodes, respectively, a second transparent substrate which has formed thereon at least one second transparent electrode opposed to the first transparent electrodes, respectively, and having common-side electrodes on its both sides, a first common drive line connected to one of the common-side electrodes of the second transparent electrode, a second common drive line connected to the other common-side electrode of the second transparent electrode, and liquid crystal sealed between the first and second transparent substrates, the liquid crystal having dielectric anisotropy which reverses according to frequency, and in which regions over which light is transmitted through the first transparent electrodes and the second transparent electrode disposed opposite thereto define a plurality of cell windows;

wherein, in a close mode for closing all of the cell windows, a low-frequency voltage is applied across the first transparent electrodes and the second transparent electrode disposed opposite thereto; and wherein, in a diaphragm mode for diaphragming at least one of the cell windows, low-frequency voltages corresponding to respective pixel signals are applied to the first transparent electrodes and two different high-frequency voltages are applied to the first and second common drive lines, respectively, forming a high-frequency gradient the second transparent electrode.

9. The liquid crystal cell array driving method of claim 8, wherein the low-frequency voltages corresponding to respective pixel signals are unipolar.

10. The liquid crystal cell array driving method of claim 9, wherein the high-frequency voltages applied to the first and second common drive lines in the diaphragm mode are both bipolar high-frequency voltages and a period for the diaphragm mode is preceded or followed by a polarity deviation compensating period for compensating for polarity deviation applied to the liquid crystal by the unipolar low-frequency voltages.

11. The liquid crystal cell array driving method of claim 9, wherein the high-frequency voltages which are applied to the first and second common drive lines have a voltage waveform comprising bipolar high-frequency voltages of different wave heights are superimposed on unipolar low-frequency voltages, respectively, and each low-frequency voltage corresponding to each pixel signal has a fixed wave height and is generated at timing corresponding to the pixel signal relative to the high-frequency voltages.

12. A method for driving a liquid crystal cell array which includes a first transparent substrate which has formed thereon a plurality of first transparent electrodes and a plurality of individual cell drive lines connected to the first transparent electrodes, respectively, a second transparent substrate which has formed thereon at least one second transparent electrode opposed to the first transparent electrodes, respectively, and having common-side electrodes on its both sides, a first common drive line connected to one of the common-side electrodes of the second transparent electrode, and a second common drive line connected to the other common-side electrode of the second transparent electrode, and liquid crystal sealed between the first and second transparent substrates, the liquid crystal having dielectric anisotropy which reverses according to frequency, and in which regions over which light is transmitted through the first transparent electrodes and the second transparent electrode disposed opposite thereto define a plurality of cell windows;

wherein, in a close mode for closing all of the cell windows, a low-frequency voltage is applied across the first transparent electrodes and the second transparent electrode disposed opposite thereto; and wherein, in a diaphragm mode for diaphragming at least one of the cell windows, high-frequency voltages corresponding to respective pixel signals are applied to the first transparent electrodes and two different low-frequency voltages are applied to the first and second common drive lines, forming a low-frequency voltage gradient in the second transparent electrode.

13. The liquid crystal cell array driving method of claim 12, wherein the different low-frequency voltages which are applied to the first and second common drive lines in the diaphragm mode are each superimposed with a unipolar fixed high-frequency voltage and the high-frequency voltages which are applied to the respective first transparent electrodes are unipolar high-frequency voltages.

14. The liquid crystal cell array driving method of claim 8, a compensating mode period is provided for compensating a response distribution in a period of the diaphragm mode, and in the compensating mode, two high-frequency voltages which are reverse in magnitude from the two different high-frequency voltages applied to the first and second common drive lines in the diaphragm mode per are applied thereto.

15. The liquid crystal cell array driving method of claim 14, wherein the smaller one of the two high-frequency voltage which are applied to the first and second common drive lines in the compensating mode period is 16. The liquid crystal cell array driving method of claim 12, wherein a compensating mode period is provided for compensating for a response distribution in the diaphragm mode period, and in the compensating mode, two low-frequency voltages which are reverse in magnitude from the two different low-frequency voltages applied to the first and second common drive lines in the diaphragm mode are applied thereto.

17. The liquid crystal cell array driving method of one of claims 14 or 16, wherein the low-frequency voltage in the close mode is applied to each the individual cell drive line.

18. The liquid crystal cell array driving method of one of claim 14 or 16, wherein the low-frequency voltage in the close mode is applied to the first and second common drive lines.

19. The liquid crystal cell array driving method of claim 14, wherein, in all operation mode periods, a unipolar low-frequency voltage is applied as a bias voltage to the first and second common drive lines; in the close mode period, a unipolar low-frequency voltage 180° out of phase with the unipolar low-frequency voltage is applied to each individual cell drive line; and in the diaphragm mode period, the unipolar low-frequency voltage which is applied to each individual cell drive line has, in the first half of each cycle thereof, a waveform of a duty ratio corresponding o the pixel signal and, in the second half of each cycle thereof, a waveform of a duty ratio reverse from that in the first half of the cycle.

* * * * *